US011903351B2

(12) United States Patent
Sperry et al.

(10) Patent No.: US 11,903,351 B2
(45) Date of Patent: Feb. 20, 2024

(54) GROW CUPS FOR HYDROPONIC GROWING SYSTEMS

(71) Applicant: Pod Farms, LLC, Mechanicsville, VA (US)

(72) Inventors: Toni Sperry, Blacksburg, VA (US); John Puleo, Greenville, SC (US); Rhea Davenport, Greeley, CO (US)

(73) Assignee: Pod Farms, LLC, Mechanicsville, VA (US)

( * ) Notice: Subject to any disclaimer, the term of this patent is extended or adjusted under 35 U.S.C. 154(b) by 279 days.

(21) Appl. No.: 17/522,322

(22) Filed: Nov. 9, 2021

(65) Prior Publication Data
US 2022/0061242 A1 Mar. 3, 2022

Related U.S. Application Data

(63) Continuation-in-part of application No. 16/530,258, filed on Aug. 2, 2019, now Pat. No. 11,206,774.
(Continued)

(51) Int. Cl.
*A01G 31/06* (2006.01)

(52) U.S. Cl.
CPC .................... *A01G 31/06* (2013.01)

(58) Field of Classification Search
CPC .. A01G 27/001; A01G 27/003; A01G 27/005; A01G 27/006; A01G 27/02; A01G 27/06; A01G 31/06; A01G 2031/006; A01G 31/02; A01G 9/022; A01G 9/023; A01G 9/14; A01G 9/16; A01G 9/24; A01G 9/247
See application file for complete search history.

(56) References Cited

U.S. PATENT DOCUMENTS 3,053,011 A    9/1962  Silverman
5,546,984 A    8/1996  Arcaro
(Continued)

FOREIGN PATENT DOCUMENTS

WO    WO 2017/205420 A1    11/2017

OTHER PUBLICATIONS

ISA/US; International Search Report and Written Opinion; prepared for PCT/US2020/044531; dated Oct. 22, 2020.
(Continued)

*Primary Examiner* — Trinh T Nguyen
(74) *Attorney, Agent, or Firm* — Kirk A. Wilson; Joseph T. Guy; Patent Filing Specialist Inc.

(57) ABSTRACT

A removable grow cup having a grow media receptacle, a nutrigation coupler extending from the grow media receptacle, the nutrigation coupler having a socket member and a mating detachable plug member. The plug member has a nutrigation inlet extending from the grow media receptacle. The nutrigation inlet is configured to distribute nutrient rich water in the grow media receptacle using at least one of a nutrient film technique and intermittent flow saturation technique. The socket member has a self-sealing valve, a socket housing, and a means for engaging said plug member. A means for attaching the grow media receptacle to at least one of a wall, planting column, and nutrigation manifold is provided. An outlet port extends from the grow media receptacle and is configured as a root growth channel and nutrient rich water exhaust port.

13 Claims, 19 Drawing Sheets

Related U.S. Application Data

(60) Provisional application No. 62/713,781, filed on Aug. 2, 2018.

(56) References Cited

U.S. PATENT DOCUMENTS

| | | | | |
|---|---|---|---|---|
| 10,477,786 | B1* | 11/2019 | Wilson | A01G 9/042 |
| 11,785,894 | B2* | 10/2023 | Allgeier | A01G 9/023 |
| | | | | 47/62 R |
| 2014/0000162 | A1 | 1/2014 | Blank | |
| 2014/0090295 | A1 | 4/2014 | Fambro | |
| 2014/0318012 | A1 | 10/2014 | Fujiyama | |
| 2015/0305261 | A1 | 10/2015 | Wilson et al. | |
| 2015/0313104 | A1* | 11/2015 | Cottrell | A01G 22/00 |
| | | | | 47/62 A |
| 2015/0334930 | A1* | 11/2015 | Stoltzfus | A01G 9/022 |
| | | | | 47/62 A |
| 2016/0050863 | A1 | 2/2016 | Graber | |
| 2017/0094920 | A1 | 4/2017 | Ellins | |
| 2017/0105372 | A1 | 4/2017 | Bryan | |
| 2017/0265408 | A1 | 9/2017 | McGowan et al. | |
| 2018/0007845 | A1 | 1/2018 | Martin | |
| 2018/0014485 | A1 | 1/2018 | Whitcher et al. | |
| 2018/0092314 | A1 | 4/2018 | McGuinness et al. | |
| 2018/0263201 | A1 | 9/2018 | Linneberg | |
| 2018/0295800 | A1* | 10/2018 | Kiernan | A01D 45/00 |
| 2020/0037526 | A1 | 2/2020 | Sperry et al. | |
| 2020/0093082 | A1* | 3/2020 | Mathieu | A01G 7/045 |
| 2020/0229357 | A1* | 7/2020 | Spiro | A01G 9/247 |
| 2020/0344965 | A1 | 11/2020 | Song et al. | |
| 2021/0105955 | A1* | 4/2021 | Schroeder | A01G 9/24 |
| 2021/0212276 | A1* | 7/2021 | Hersh | A01G 31/06 |
| 2023/0000024 | A1* | 1/2023 | Hartlage | A01G 31/06 |
| 2023/0284576 | A1* | 9/2023 | Tyink | A01G 31/06 |
| | | | | 47/62 R |

OTHER PUBLICATIONS

Bartok, J. W. (2009). Hydroponic Systems. Retrieved Nov. 12, 2020, Univ of Massachusetts Amherst: https://ag.umass.edu/greenhouse-floriculture/fact-sheets/hydropnic-systems.

Lagomarsino, V. (Sep. 26, 2019). Hydroponics: The power of water to grow food;Harvard Univ. : http://sitn.hms.harvard.edu/flash/2019/hydroponics-the-power-of-water-to-grow-food/.

Sorenson, R. (May 1, 2009). Home Hydroponics. Retrieved Nov. 12, 2020, from Virginia Cooperative Extension: https://www.pubs.ext.vt.edu/426/426-084/426-084.html.

Treftz, C. K. (2015). Hydroponics: A Brief Guide to Growing Food Without Soil. Retrieved from Univ of Nevada, Reno: https://extension.unr.edu/publication.aspx?PubID=2756.

U.S. Department of The Interior. (May 21, 2018). Hydroponics: A Better Way to Grow Food. Retrieved from Nat'l Park Service: https://www.nps.gov/articles/hydroponics.htm#:~:text.

ISA/US; International Search Report and Written Opinion; prepared for PCT/US2022/046716; dated Jan. 24, 2023.

\* cited by examiner

GROW CUPS FOR HYDROPONIC GROWING SYSTEMS

CROSS-REFERENCE TO RELATED APPLICATIONS

The present invention claims priority to U.S. Provisional Patent Application No. 62/713,781, filed Aug. 2, 2018, and U.S. patent application Ser. No. 16/530,258, filed Aug. 2, 2019, all of which are incorporated herein by reference in their entirety.

FIELD OF THE DISCLOSURE

The disclosure relates generally to systems and methods for vertical hydroponic growing of plants within an optional enclosure, in particular utilizing liquid nutrigation and/or solid nutrient medium/supplements in combination with vertically configured arrays of interchangeable grow cups to produce near year-round ideal plant growing conditions.

The disclosure also relates to the grow cups and couplers, that holds the seeds, plant, grow media, and optional nutrients in a hydroponic irrigation system. The system to support the cup can be vertical, for example a wall or cylinder, or horizontal, for example an irrigation line. The grow cups have various embodiments that support vertical or horizontal water/nutrient flow, and different configurations supporting a variety of crop types, with the fluid inlet and outlet configuration being relatively similar.

BACKGROUND OF THE DISCLOSURE

Hydroponics is the act of growing plants using nutrient-rich water. Plant roots in hydroponics are either continuously or periodically supplied nutrient-rich water with macro and micro plant nutrients in aqueous solution. Various arrangements of hydroponic irrigation systems have contributed to successful growing practices in both a large, commercial farming scale, and home gardening. It strips down conventional growing methods by only utilizing what is required for plants to grow; water, light, nutrients, and airflow. The use and growth of hydroponic systems have rapidly increased since initial research of growing soilless nearly 100 years ago and has established a wide range of complexity dependent on production Vertical farming is the act of utilizing multiple levels in a vertical space to grow more plants per square foot and/or grow plants on vertical surfaces that otherwise could not support plants. When hydroponics is combined with vertical farming, it creates a powerful space saving and productive system.

Interest in vertical hydroponic growing systems has dramatically increased over the last few decades and there exists many known variations, including devices for commercial and home applications. Hydroponics is a sustainable farming practice because water and nutrients are typically recirculated, runoff can be eliminated so natural environments are not disturbed, and because hydroponics does not use soil, long term implications of traditional farming will not have the impact of soil nutrient depletion—which is a growing concern among older farming locations. Another benefit is the need for less water. With this method of growing, the plants are within a closed system where the water is captured and reused and uses as little as 90% percent less water than conventional growing methods.

One of the greatest benefits of hydroponics is higher yield. In an indoor greenhouse, plants grown hydroponically have a higher probability of survival; plants have little to no interference from pathogens transmittable by insects, weather conditions, and soil-borne diseases allowing for excess in plants with better quality. Produce also grows in some cases 50 percent faster in hydroponics than in soil, allowing users to double their harvest. Attached to higher yield is greater density; crops can be planted closer together with no restrictive access to the roots, because plants are grown within the nutrient-rich water solution, roots do not spread rather they grow straight down. These benefits of hydroponic farming can also be applied to home use and is especially of interest to those who live in environments with harsher weather conditions or shorter growing seasons.

There are numerous hydroponic systems. Most if not all hydroponic systems utilize a reservoir of water mixed with a nutrient solution, which receives a constant supply of oxygen using an aquatic pump connected to tubing and an air stone. In substitution of soil, hydroponics takes advantage of an array of pH-neutral mediums such as perlite, vermiculite, Rockwool, clay pebbles, and coco fibers. The nutrient-rich water is delivered to the roots of the plants which grow through the medium, either through a timed system or through a constant flow that returns to or remains in the reservoir for reuse. Systems that run in timed intervals are aeroponics, drip systems, and ebb & flow. In an Aeroponic system, the roots are suspended in the air and are misted with the nutrient solution, which both provides saturation, nutrients and aeration. Drip systems work similarly to aeroponics, but rather than the nutrient being delivered directly to the roots, it is dripped onto the base of each plant through a drip line. Ebb & flow, also known as flood and drain works by pumping water into the grow tray, bringing water and nutrients to the plant roots by either absorption by the grow-media or direct contact of the roots, and is then slowly drained back into the reservoir. Systems, where plants receive a continuous supply of water, include nutrient film technique (NFT), deep water culture (DWC), and wicking systems. Nutrient Film Technique, or NFT, pumps water from the base reservoir up into grow channels where the nutrient rich water flows as a film across the channel and makes direct contact with the roots of the plant. Aeration of the roots is simply created from the space between the water and the top of the channel. The nutrient water can flow through the grow channels at a downward slope working with gravity allowing for a consistent flow of nutrients to the plants roots and adequate oxygenation.

Attached to higher yield is greater density; crops can be planted closer together with no restrictive access to the roots, because plants are grown within the nutrient-rich water solution, roots do not spread rather they grow straight down. Another benefit is the need for less water. With this method of growing, the plants are within a closed system where the water is captured and reused and uses as little as 90% percent less water than conventional growing methods.

The present invention primarily represents advancement in a new version of hydroponics that combines that of nutrient film technique (NFT), aeroponics, intermittent watering, and vertical integration, which is named intermittent flow saturation technique (IFST) and detailed in this disclosure.

BRIEF SUMMARY OF THE INVENTION

A removable grow cup having a grow media receptacle, a nutrigation coupler extending from the grow media receptacle, the nutrigation coupler having a socket member and a mating detachable plug member. The plug member has a nutrigation inlet extending from the grow media receptacle. The nutrigation inlet is configured to distribute nutrient rich water in the grow media receptacle using at least one of a nutrient film technique and intermittent flow saturation technique. The socket member has a self-sealing valve, a socket housing, and a means for engaging said plug member. A means for attaching the grow media receptacle to at least one of a wall, planting column, and nutrigation manifold is provided. The nutrigation coupler can also have a plunger, a biasing element, a socket seal, and at least one plug seal. An outlet port extends from the grow media receptacle and is configured as a root growth channel and nutrient rich water exhaust port.

The grow media receptacle can have at least one vegetable green insert and at least one retention plate to form at least one draining chamber and at least one saturation chamber, wherein the receptacle is configured for growing vegetable greens.

The removable grow cup can have a plurality of grow cup receptacles disposed on a cascade housing configured for vertical cascade nutrient rich water flow.

DETAILED DESCRIPTION OF THE INVENTION

Intermittent flow saturation technique (IFST) systems described herein can provide more rapid plant maturity, more efficient nutrient absorption and pathogen suppression and therefore can increase crop yields, lower water consumption and provide a higher degree of grower control over the multitude of variables affecting production. These IFST systems are suitable for installation indoors and in shaded structures with or without use of climate-moderating greenhouse enclosures and are capable of supporting cultivation of a near infinite variety of food, fiber, floriculture, medicinal and scientific crops. When installed in a climate-moderating greenhouse enclosure, or a modular transportable greenhouse enclosure, the hydroponic growing system and method offers the grower lightweight, durable, low maintenance, productive and highly resource efficient grow cups capable of adjustment to suit grower needs.

The nutrient levels, pH of nutrient rich water, etc. may be monitored continually and/or intermittently, and may be adjustable throughout the crop cycle, with the option to provide each grow cup with the same or a different nutrigation solution depending on crop type and stage of growth. The liquid nutrient solution and nutrient management may be fully automated and monitored to feedback to the database. The term nutrient rich water and water may be used interchangeably in this disclosure. Nutrigation may be adjusted by an operator as required; in particular, the operator may add supplements to improve plant health, crop quality and/or nutritional value of the crop.

Nutrigation flowrates may be pre-selected via the growth control system 50 and database which may record the location and contents of each grow cup, including for instance varietal information, sowing date, harvest date and any other information that may be desired, including information related to nutrient delivery, temperature, humidity and lighting throughout the growing cycle. The controller/control system and database enables complete traceability from sowing to harvest for each crop product.

The inlet port(s) may deliver nutrient rich water and nutrients to each grow cup, providing saturation and nutrients to the plant roots before draining and recirculating back into the hydroponic system. Each grow cup may be supplied with a specified (dynamically controllable) volume of fluid/nutrient. Nutrigation frequency and volume is specific to the stage of growth or individual plant requirements for each grow cup. The terms grow cup and cultivation pod are interchangeable as taught herein. The terms vegetable green grow cup and microgreen grow cup are interchangeable as taught herein. The terms nutrigation fluid and nutrient rich water are interchangeable as taught herein.

Figure 1:
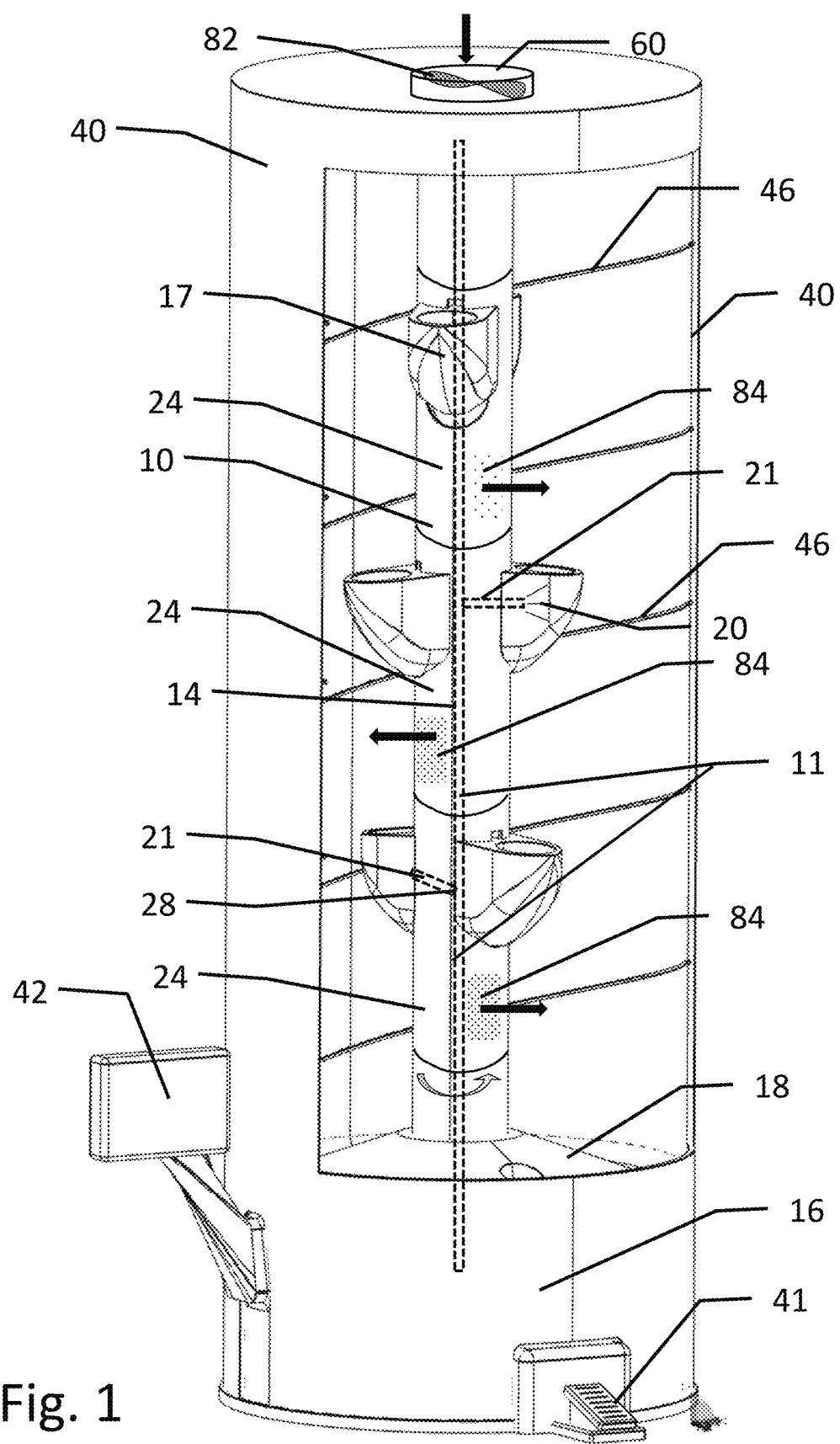
FIG. 1 illustrates a side perspective of one embodiment of the growing system.
Figure 2:
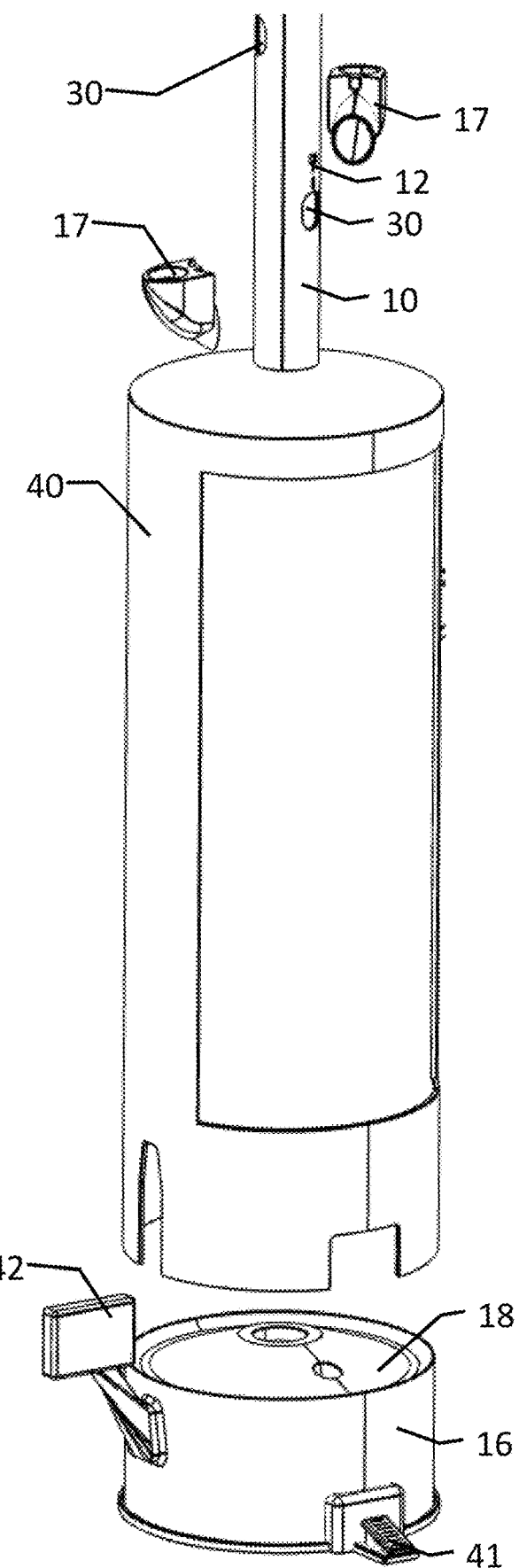
FIG. 2 illustrates an exploded view of a typical growing system.

With reference to the drawings, the invention will now be described in more detail. Referring to FIGS. 1 and 2, an aeroponic plant cultivating apparatus is shown. The apparatus includes a rotating planting column 10 constructed and arranged with a hollow interior for receiving a nutrigation manifold 11. The manifold 11, as used herein, includes any element used to transport the nutrigation fluid, or nutrient rich water. Connect ports, designated generally as 12, are located around planting column 10 for allowing nutrient rich water supply and return to be routed to removable grow cups 17. A central pipe 14 and multiple branches of the nutrigation manifold 11 are disposed within and carried by planting column 10, which extends axially through the hollow interior of the planting column 10 for supplying nutrient rich water from a bottom reservoir 16 to each of the branches. The central pipe 14 need not be centrally positioned within planting column 10. A reservoir 16 is provided for holding nutrient rich water that feeds the plants in each removable grow cup 17. A platform 18 is carried by reservoir 16 that engages the bottom portion of planting column 10 to mount the planting column 10 in a generally vertical orientation atop reservoir 16. As explained further below, planting column 10 is in fluid communication with reservoir 16 for circulating nutrient rich water. The central pipe 14 extends into the reservoir 16 for fluid communication to branches for directing nutrient rich water from reservoir 16 upward. Accordingly, fluid may be circulated through the planting column to provide nutrients to the removable grow cups 17 for growing plants inserted into the grow cups 17.

Figure 3:
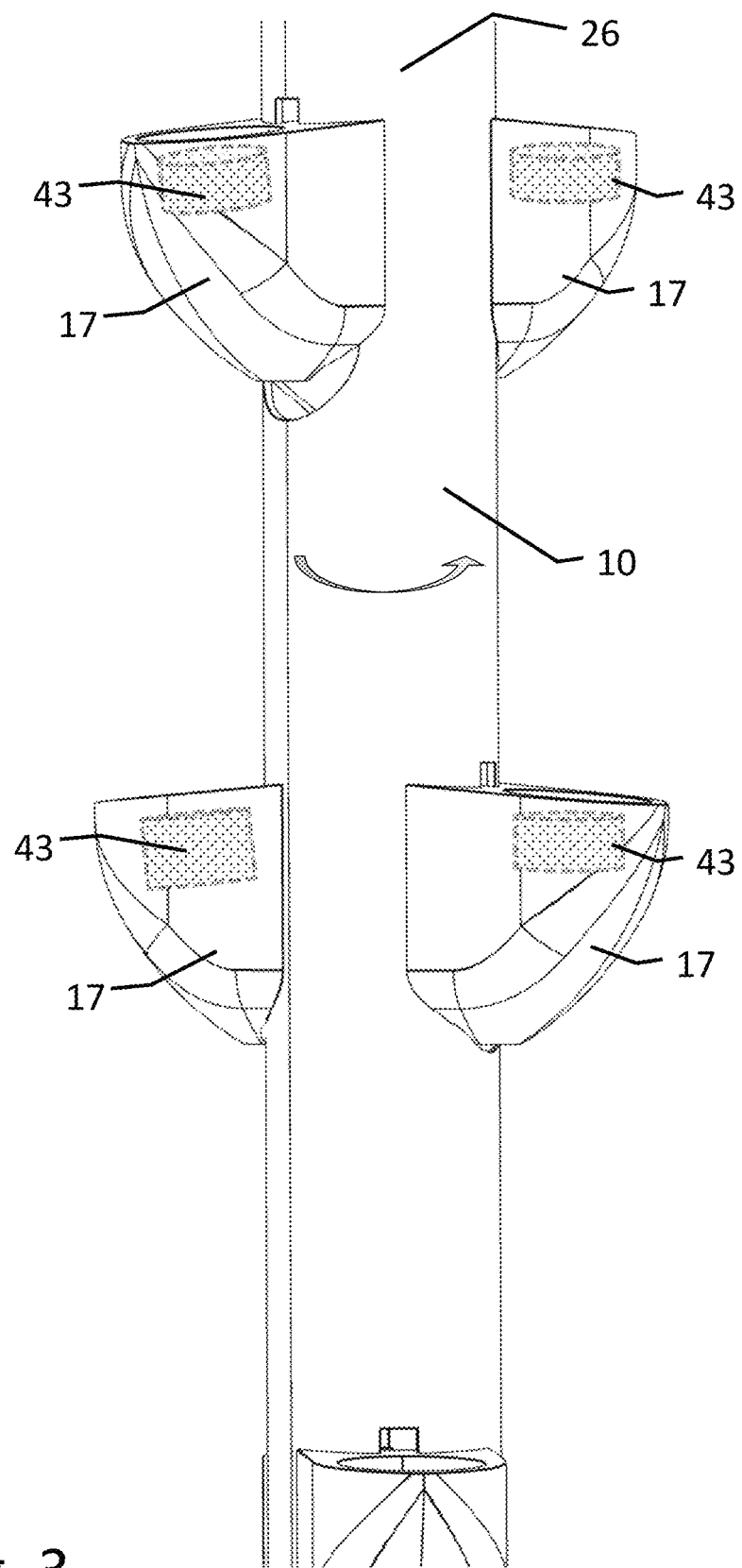
FIG. 3 illustrates a typical planting column with grow cups attached.

The planting column 10 can be formed from a plurality of modules 24. Each of modules 24 having interior walls 26 (See FIG. 3) forming a hollow module interior. Each module also includes an open top end and open bottom end. The fit between modules 24 should be twist lock, watertight arrangement. An adjacent lower module 24 in planting column 10 can be stacked end-to-end to form continuous central pipe 14 which provides a continuous fluid passageway through the entire planting column, regardless of the number of modules stacked together. By making planting column 10 modular with central pipe 14, modules 24 can be exchanged at any time without having to worry about reinstalling a single elongated piece of conduit through all the planting column 10. Accordingly, this allows for crop staging and adding or removing modules as necessary without having to rebuild the entire planting column 10.

The planting column 10 and grow cup embodiments 17, 100, 200, 300 can be constructed of materials that do not release strong emissions to the plant roots or water, such as PVC, high impact polystyrene, or suitable thermoplastic such as polyethylene terephthalate glycol, commonly known as PETG or PET-G. These types of materials also provide insulated walls for promoting a consistent temperature within the column and grow cups. Polystyrene is a particularly effective insulator due to air gaps created in the material that act as a buffer. Additionally, these air gaps make polystyrene very light, regardless of whether it is a hardened or softer version of polystyrene.

Rotation of the planting column 10 can be initiated and controlled by a foot pedal 41 or other rotation means being operably connected to the rotatable planting column 10. The nutrigation manifold 11 also rotates with the planting column 10 at the swivel coupling 38 (see FIG. 6). Additionally, at least one user interface device 42, such as a touch screen, can electronically communicate with the growth control system 50 (see FIG. 6) to monitor and control parameters in the control circuit 58. The control circuit 58 can also wirelessly communicate with a remote user interface device, such as a smartphone or tablet, to access control parameters and monitor plant growth.

An optional modular greenhouse enclosure 40 can be used for plant protection and climate control. The position and orientation of the enclosure 40 can be adjusted for proper function and access. An access door can be provided in the enclosure 40 to provide easy access to the crops and planting column components. The enclosure can optionally include transparent or translucent cover, ventilation means, lighting and other elements of a contemporary greenhouse system can be included. The lighting system 46 can be disposed inside the enclosure 40 or can be attached to the outside of the enclosure 40. Additionally, the lighting system 46 can be used without the enclosure 40 using a separate support structure. The lighting system 46 can use dimmable lighting elements such as full-spectrum light emitting diodes (LED), switchable, selectable or tunable frequency (color temperature) LED's frequency, or other lighting elements as determined and controlled by the growth control system 50. The climate-moderating modular greenhouse enclosure 40 structure can have transparent, translucent, clear or darkened greenhouse side panels and roof panels as well as interior climate-moderating and air circulation systems 60. The roof panel can provide top structural support and/or hanging structural support for the entire planting column 10, with roof panel connection allowance for rotation of the planting column 10. The air circulation system 60 can use a fan 82 mounted in a roof panel to supply ambient air to the hollow interior of the planting column 10 as well as the entire enclosure 40 and slightly pressurize the planting column 10, enclosure 40 and the reservoir 16 with ambient air to support plant growth and prevent unwanted microbial growth in both the planting column 10 and reservoir 16. The planting column 10 can use perforated diffusers 84 to evenly distribute the ventilation air throughout the enclosure 40. The column 10 perforation sizes can be graduated along the length of the column such that each modular section diffuses a balanced ventilation rate throughout the column 10. The operating variables of the greenhouse enclosure, such as ventilation rate, lighting levels, and humidity levels, can be monitored and controlled by the plant growth control system 50 to maintain optimal environmental conditions for plant growth.

Figure 4:
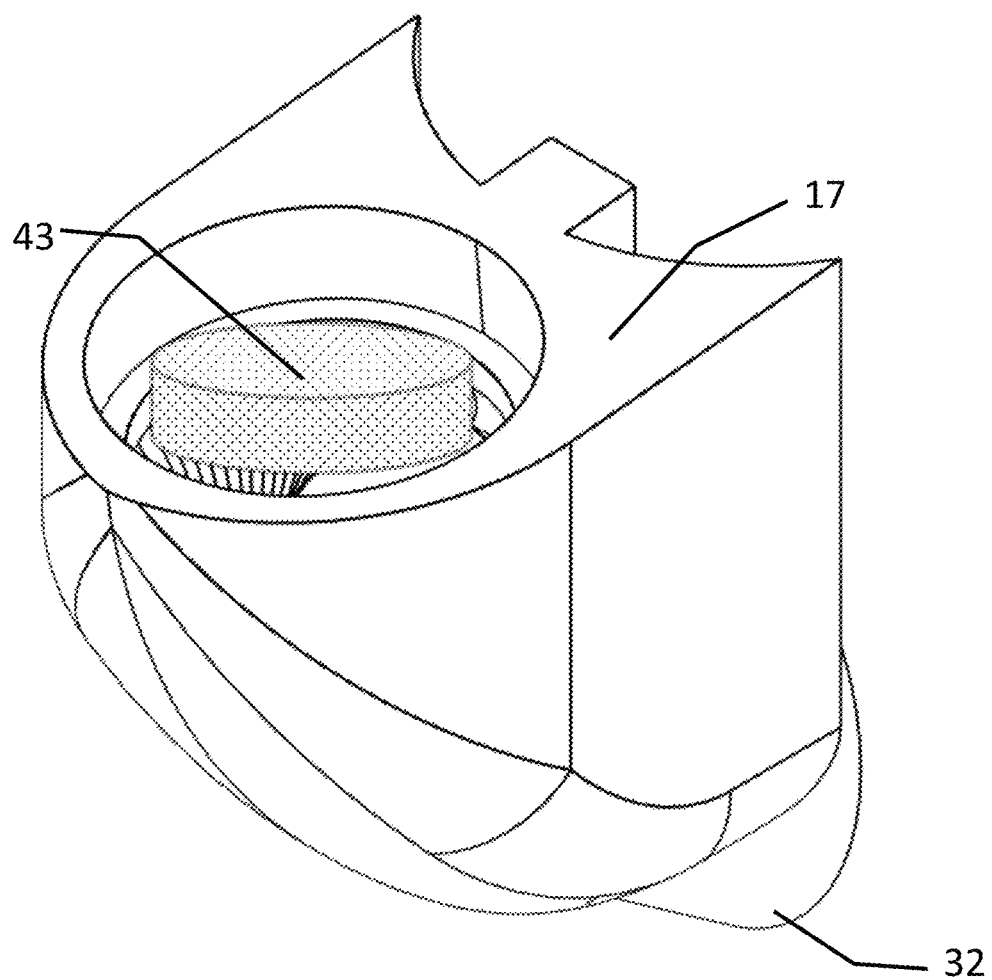
FIG. 4 illustrates a perspective of a typical grow cup.
Figure 5:
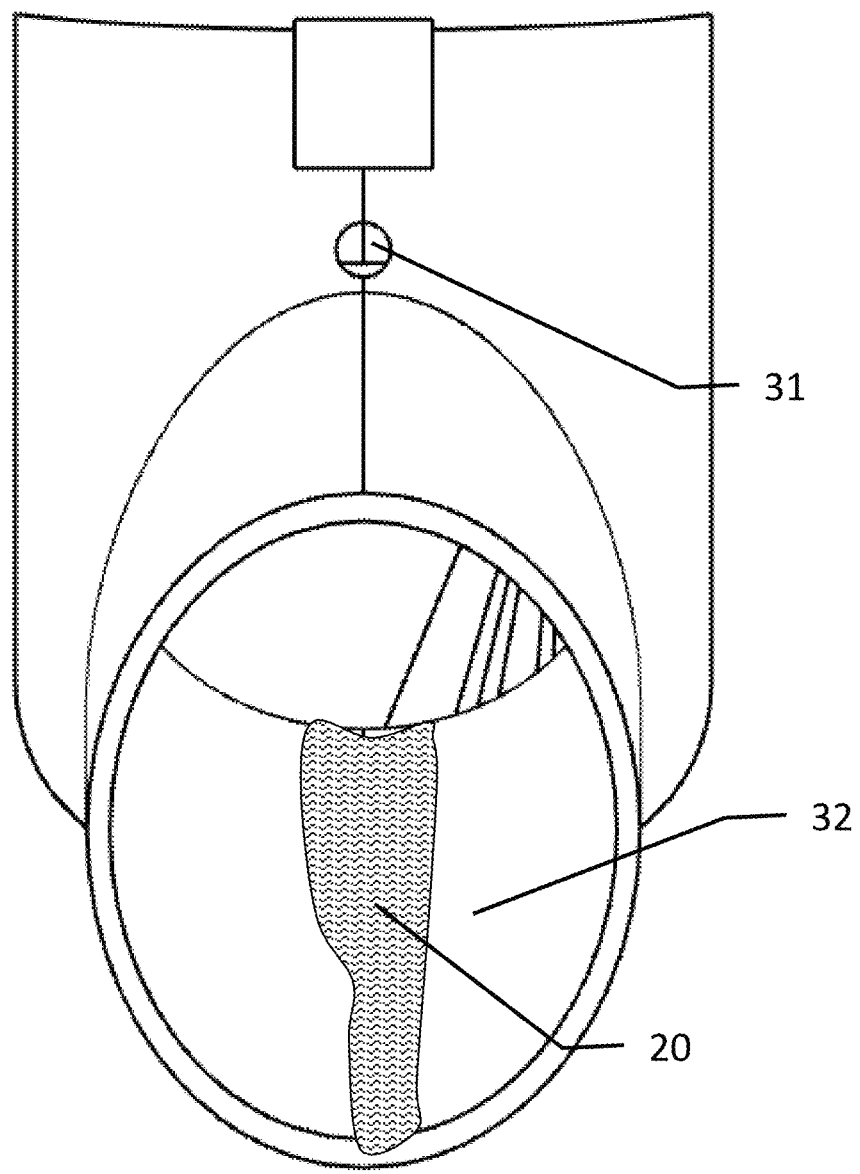
FIG. 5 illustrates a back view of a typical grow cup.
Figure 7:
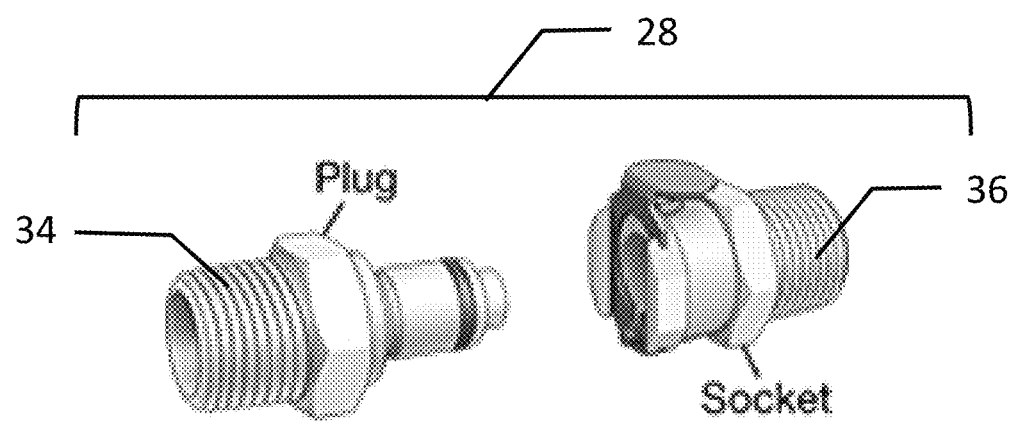
FIG. 7 illustrates one embodiment of a nutrigation coupler.
Figure 8:
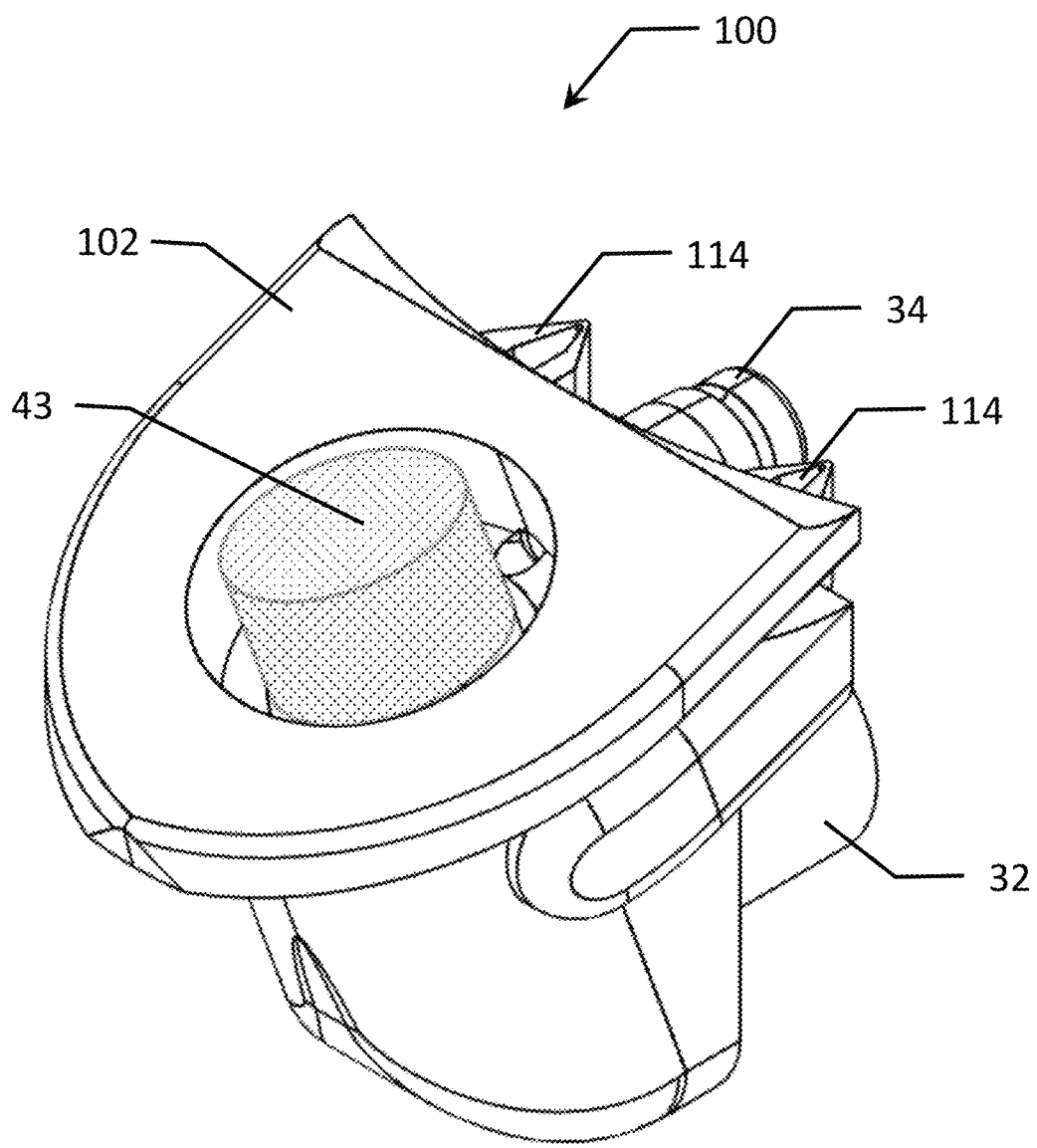
FIG. 8 illustrates a perspective view of a plug-in grow cup embodiment.
Figure 11:
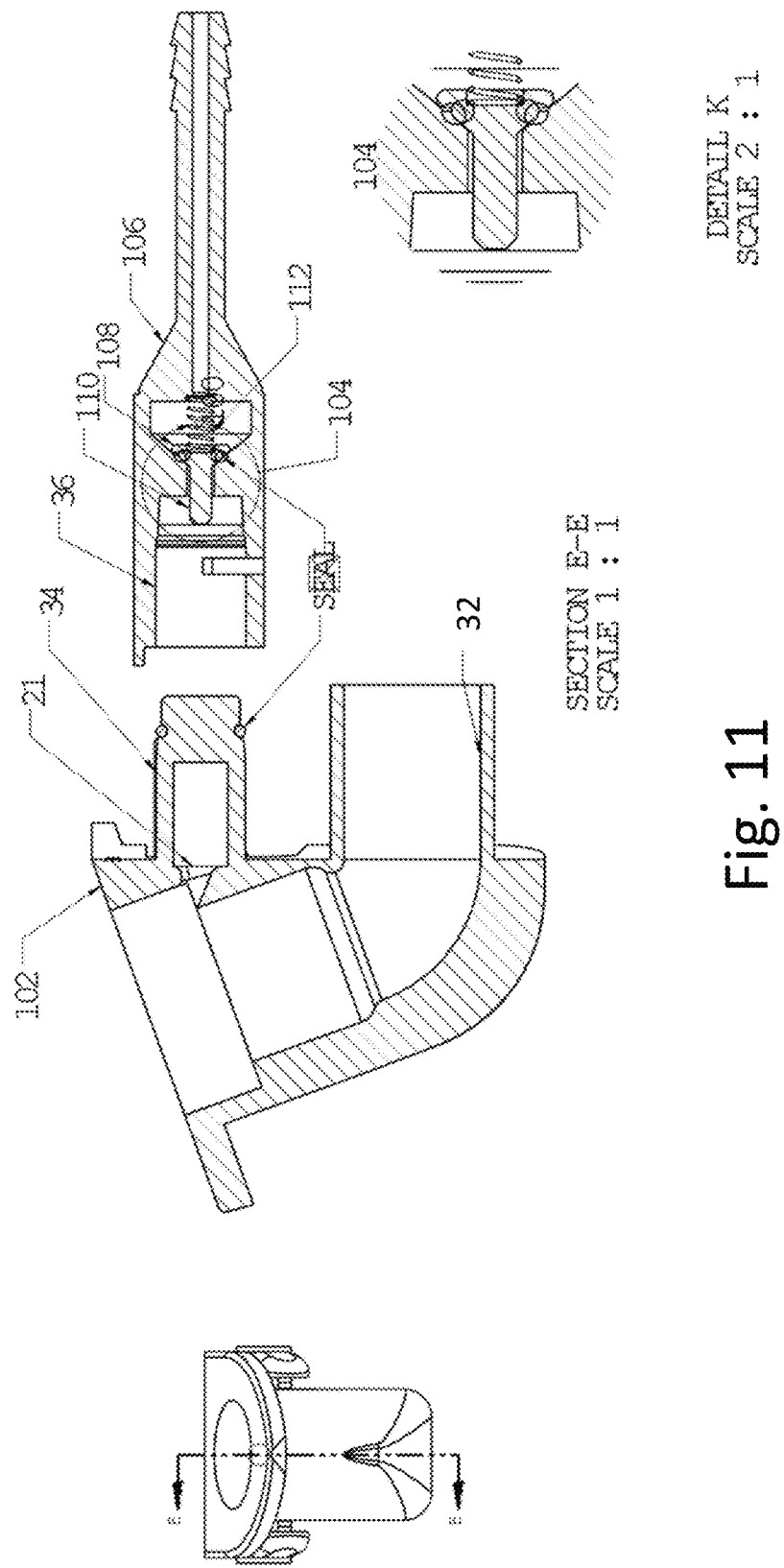
FIG. 11 illustrates an exploded section side view of the grow cup showing the internal channels and nutrigation self-sealing valve features.
Figure 12:
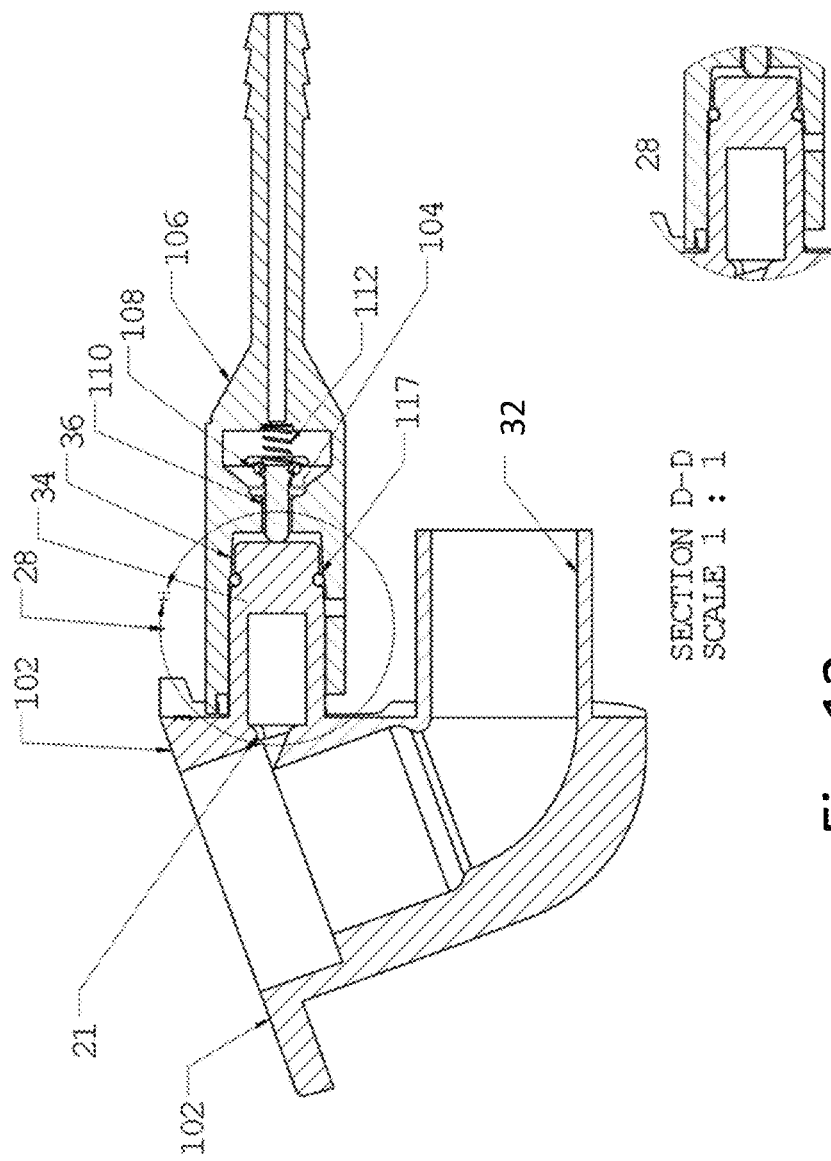
FIG. 12 illustrates a section side view of the grow cup showing the internal channels and nutrigation coupler features.
Figure 12:
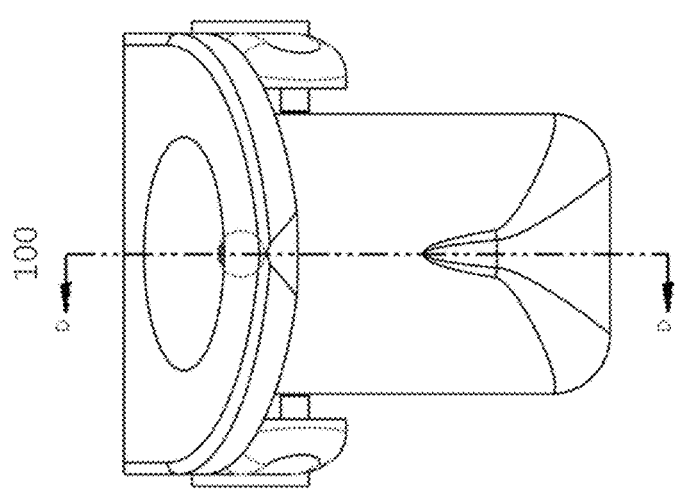
Figure 13:
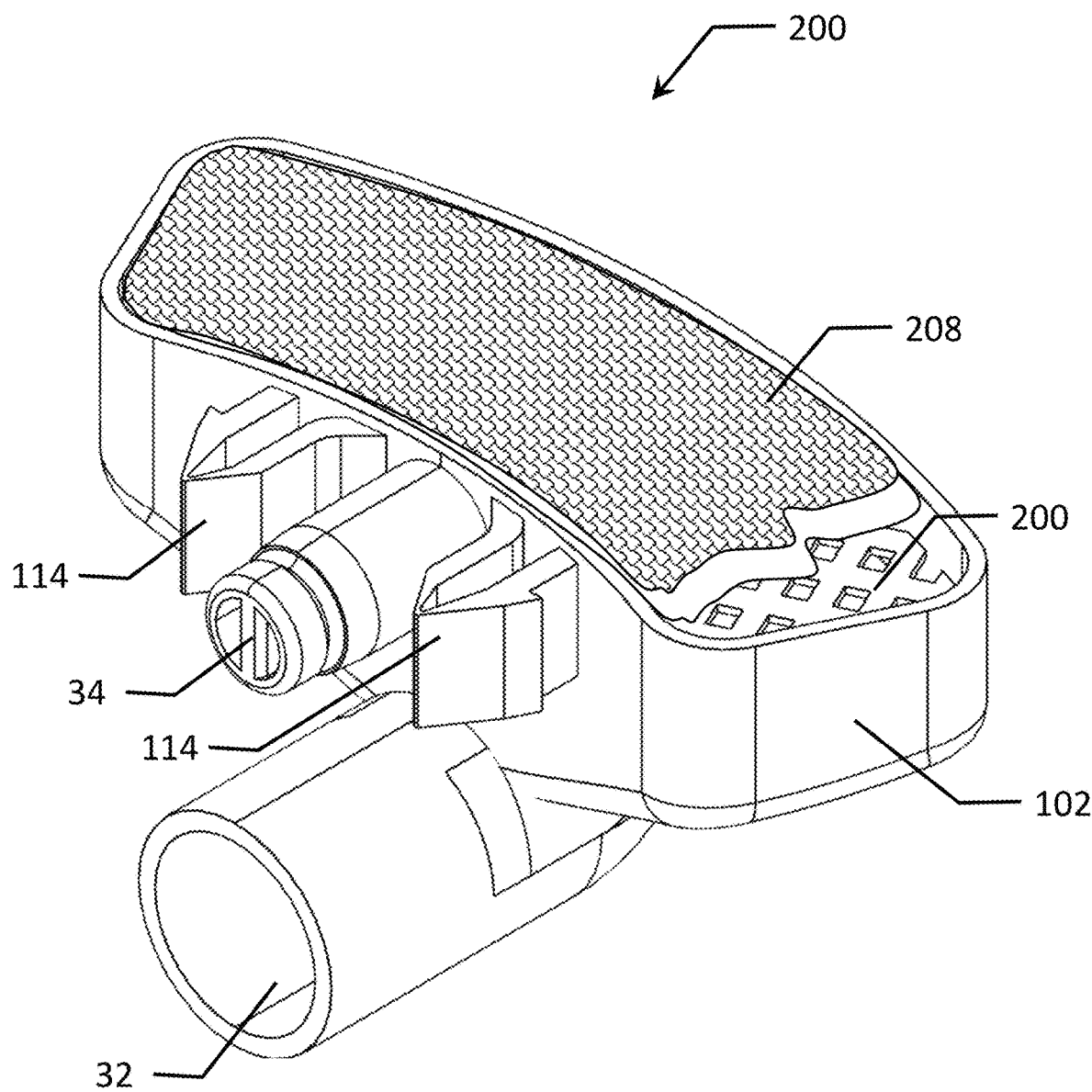
FIG. 13 illustrates a perspective view of a vegetable green grow cup embodiment.
Figure 14:
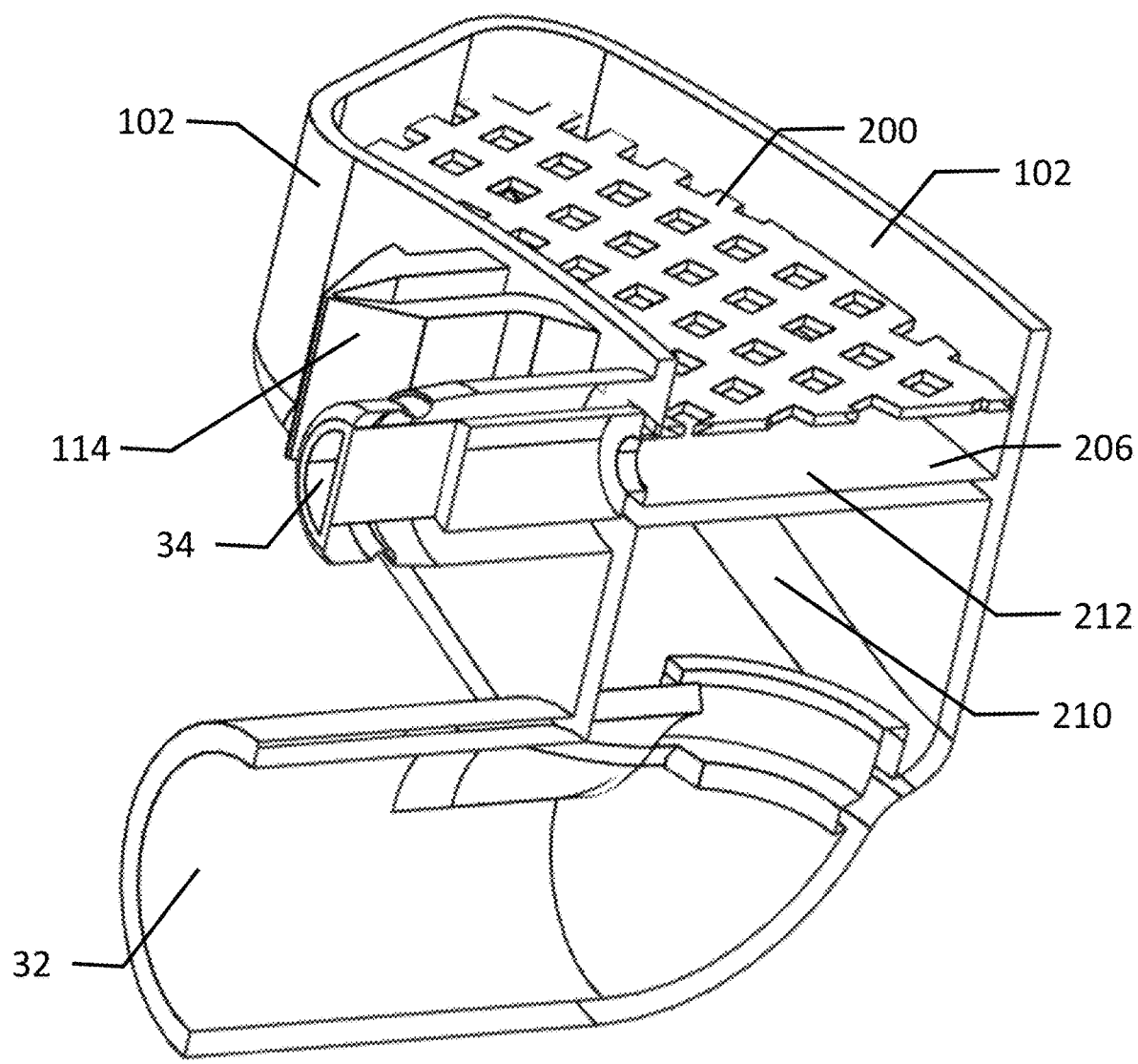
FIG. 14 illustrates a section cut of a vegetable green grow cup embodiment.
Figure 15:
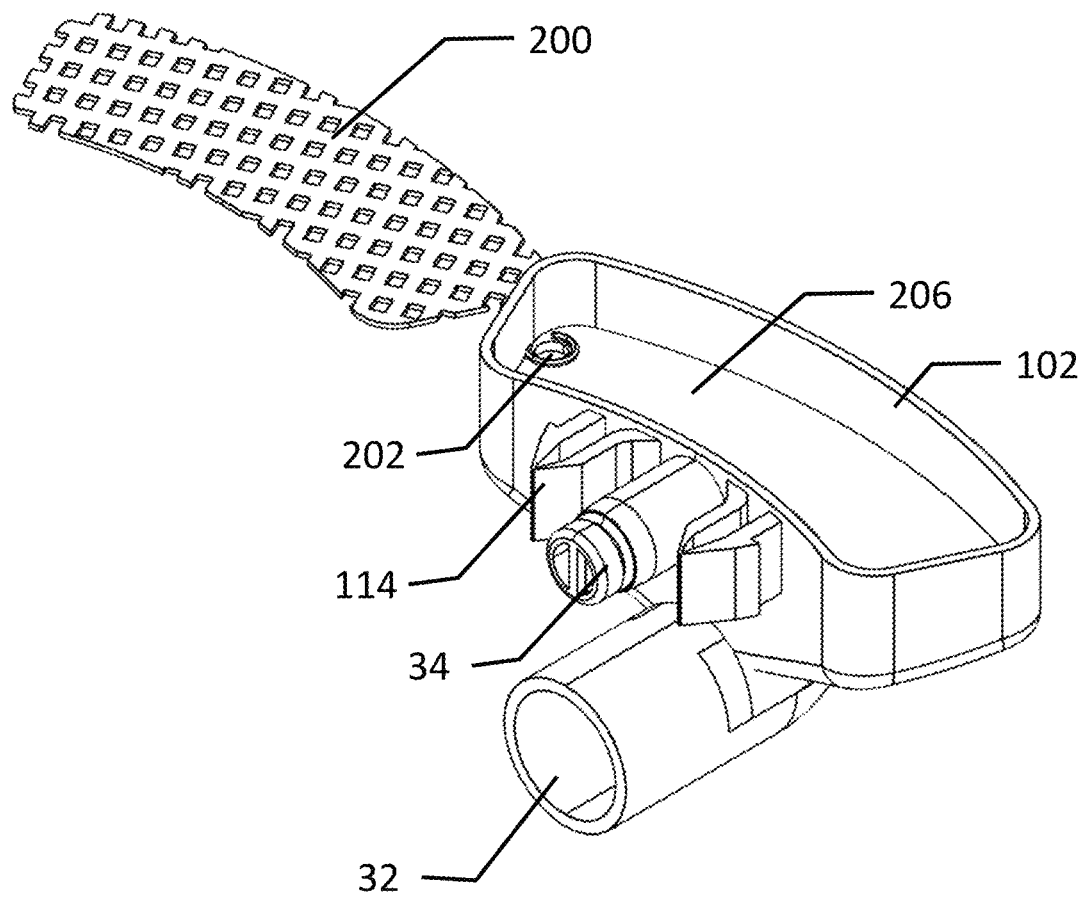
FIG. 15 illustrates an exploded view of a vegetable green grow cup embodiment.
Figure 16:
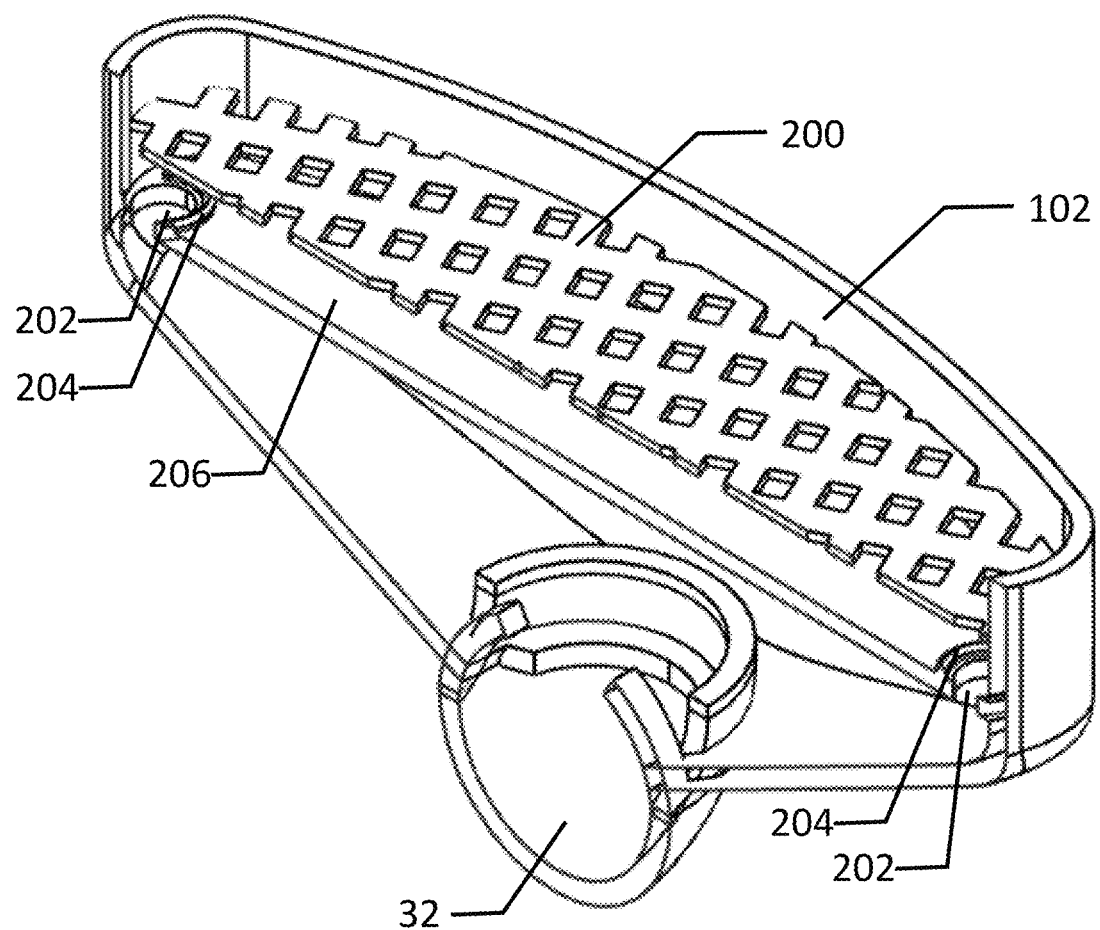
FIG. 16 illustrates another section cut of a vegetable green grow cup embodiment.

Referring to FIGS. 4 and 5, the removable grow cups 17 can be interchanged at any location on the planting column 10. Sizes of the removable grow cups 17 can vary to accommodate various plants but the connection configuration to the planting column 10 is common. One embodiment of the nutrigation coupler 28 (see FIG. 7) can be similar to a 'quick connect' fitting having a socket 36 (see FIGS. 11 and 12) disposed on the planting column 10 configured as a self-sealing valve 104 (see FIG. 11), and a plug 34 (see FIGS. 11 and 12) configured on this embodiment of the removable grow cup 17 such that when the grow cup 17 is removed, the supply of nutrient rich water 20 is blocked. A snap-type, or ball-latch quick connect, as shown in FIG. 7, incorporates a spring-loaded ball-latching mechanism as a means for engaging the plug 34 and socket 36 automatically when they are pushed together. When the releasing sleeve is pulled back, the plug 34 and socket 36 quickly disengage. Other types of quick connect fitting styles anticipated herein include bayonet, threaded, and non-latching. The non-latching type can rely on the means for attaching, taught herein, to maintain engagement of the plug 34 and socket 36. In addition, many of these styles can be single- and double-shutoff, non-shutoff and dry break (no drip) configurations. Nutrient rich water return openings 30 can be provided in planting column 10 to mate with the outlet ports 32 of the grow cups 17. Nutrient rich water return opening 30 allows the nutrient rich water in the grow cup 17 to gravity drain down the interior walls 26 of the planting column 10, or other return tubing, and into reservoir 16, where the nutrient rich water 20 can be replenished and recirculated. Grow media 43, such as rock wool, peat moss substrate or other like material, can be inserted in the removable grow cups 17 to retain the position of early-stage seedlings and other small plantings. The grow media 43 permits direct contact between the plantings and the nutrient rich water 20.

Figure 6:
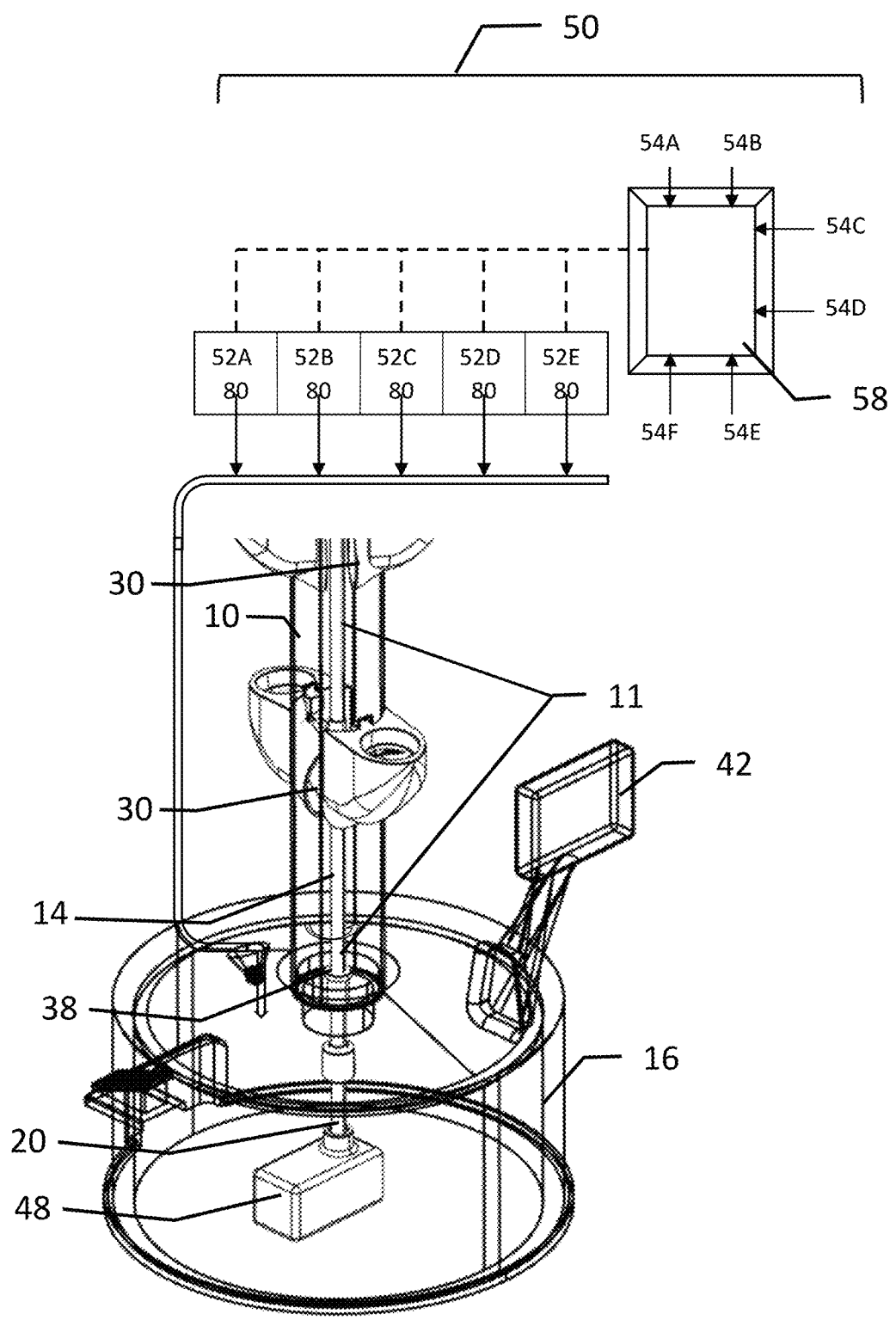
FIG. 6 illustrates the internal components of a typical reservoir.

Referring to FIG. 6, to accommodate the rotatable platform and planting column, the apparatus can include a swivel coupling 38 along central pipe 14 for allowing rotation of planting column 10 and nutrigation manifold 11 without causing rotation of the nutrient rich water piping in the reservoir 16, between the swivel coupling 38 and the reservoir 16. Swivel coupling 38 is well known to those skilled in the art and may be found at most local hardware stores. As shown in FIG. 6, a pump 48, for example a submersible pump, is provided in fluid communication with reservoir 16. A water filter, or other suitable filtering system, can be installed in the platform 18 to remove contaminants in the water supply entering the reservoir 16. Various alternative arrangements involving different types of valves and supply lines may be used to accomplish the task of diverting nutrient rich water 20 to a central pipe 14 or to a drain line and enabling a cleaning cycle.

Referring again to FIG. 6, a control valve can be included along nutrient rich water 20 supply line and operatively associated with a growth control system 50, accordingly, for selectively controlling the amount of nutrient rich water flow from the reservoir 16 through the central pipe 14. The control valve can be used to adjust the flow of fluid depending on the number of modules 24 used in the planting column 10. The growth control system 50 can also vary the timing of the pump 48 to adjust the nutrient rich water flow rate in intermittent intervals. The more modules, the higher the fluid pressure needed to pump the fluid.

For automated operation, as seen in FIG. 6, the plant growth control system 50 can be used to monitor and control plant growth. Nutrient cartridges 52A-52E can supply controlled amounts of different nutrients to the reservoir 16 as a nutrient fluid blend. Nutrient cartridges 52A-52E can contain concentrated forms of various nutritional fluids such as typical plant fertilizers, to dispense the proper amount of the proper nutrients as determined by the plant growth control system 50. Sensors 54A-54E provide input to a control circuit 58, such as a single-board computer, as inputs to the control logic and determine the proper amount of nutrients to dispense from the various nutrient cartridges 52A-52E to generate the nutrient fluid blend 56. Some of the sensors 54A-E that can be used include, nutrition concentration, water level, soil PH, soil moisture sensor, temperature sensor, humidity sensors, sunlight visible/IR/UV index sensor, and air quality sensor. Additionally, a power supply can be operatively associated with the pump 48 and the control system 50 for recirculating nutrient rich water 20 from the reservoir 16 so that watering cycles can be accomplished automatically, and the duration of the cycles adjusted accordingly. The growth control system 50 can include a cleaning cycle for the water filter and the nutrient rich water piping such that suspended solids and other contaminants can be flushed from the system through the drain line. All critical elements of the growth control system 50 can have battery back-up to maintain operation during grid power outages.

The nutrigation system may replace or supplement the liquid nutrient cartridges 52A-52E with a solid nutrient medium/supplement 80 that can be manually inserted into the reservoir 16 of included as part of the grow media 43. The solid nutrient medium/supplement 80 can provide the nutrition necessary to grow a variety of plant types. The solid nutrient compound can be a nutrient dense dry material either compressed or temperature molded to create an instant (within 24 hours) or time released (over days or weeks) supplement/medium that will release water soluble nutrient combinations into water or disperse on to plant medium or roots. The compound can contain natural sources of nutrients. The solid nutrient medium/supplement 80 compound reduces the complexity of adding liquid or powder nutrients into a hydroponic system, thereby eliminating the need to prepare nutrient supply in a particular way and to decrease the chance of improper use or exposure.

The solid nutrient medium/supplement can be formed with various levels of nutrients, depending on the types of plants grown together. The table below depicts the nutrient ranges sufficient to supply proper amounts of nutrients to different types of plant growth.

| Nutrient | Type of Crop | | | | | |
| --- | --- | --- | --- | --- | --- | --- |
| | Flowering Plants | Tomatoes | Fruit | Leafy Greens | Low-High | General |
| | Concentration mg/l (PPM) | | | | | |
| Nitrogen (N) | 170-200 | 150-200 0-20 | 50 | 150 | 50-200 | 100-250 |
| Phosphorus (P) | 40-45 | 50 | 25 | 31 | 25-50 | 30-50 |
| Potassium (K) | 280-310 | 300-500 | 150 | 210 | 150-500 | 100-300 |
| Calcium (Ca) | 115-150 | 150-300 | 65 | 90 | 65-300 | 80-140 |
| Magnesium (Mg) | 30-45 | 50 | 20 | 24 | 20-45 | 30-70 |
| Sulfur (S) | | | | 32 | NA | 50-120 |
| Iron (Fe) | | 3 | | | NA | 1-5 |
| Copper (Cu) | | .1 | | | NA | .04-2 |
| Manganese (Mn) | | 1 | | | NA | .5-1 |
| Zinc | | .1 | | | NA | .3-.6 |
| Molybdenum | | .05 | | | NA | 04-.08 |
| Boron (B) | | .3-.5 | | | NA | 2-.5 |
| Chloride (Cl) | | Max 200 | | | NA | <75 |
| Sodium | | Max 250 | | | NA | <50 |

In another embodiment, the solid nutrient medium/supplement is disposed in the grow media as a water-soluble additive. For example, the water-soluble solid nutrient medium/supplement can be integrated or infused with the grow media products such as mulch, blankets, netting and silt fencing, and various peat-based substrates such as Rapid Rooter plant starter plugs. As the nutrient rich water blend is recirculated through each grow cup, the water-soluble solid nutrient compound is dissolved into the nutrient rich water blend for absorption by the crop roots. Nutrient concentration is monitored by the growth control system 50. The supplement blend can be customized for specific crops in accordance with table above.

Dependent factors for selecting an appropriate hydroponic method include the plants or crops which are being planted and their size at maturity, along with the space that is being used. Maximizing the use of space by planting vertically is another factor to consider and can be made possible through modified systems. The grow cup attachment/devices presented herein combines and utilizes several hydroponic methods and related concepts including nutrient film technique (NFT), aeroponics, intermittent watering, and vertical integration. It has been determined that this technology does not fall into any single hydroponic categories, therefore it will be referenced herein as Intermittent Flow Saturation Technique, or IFST.

Figure 9:
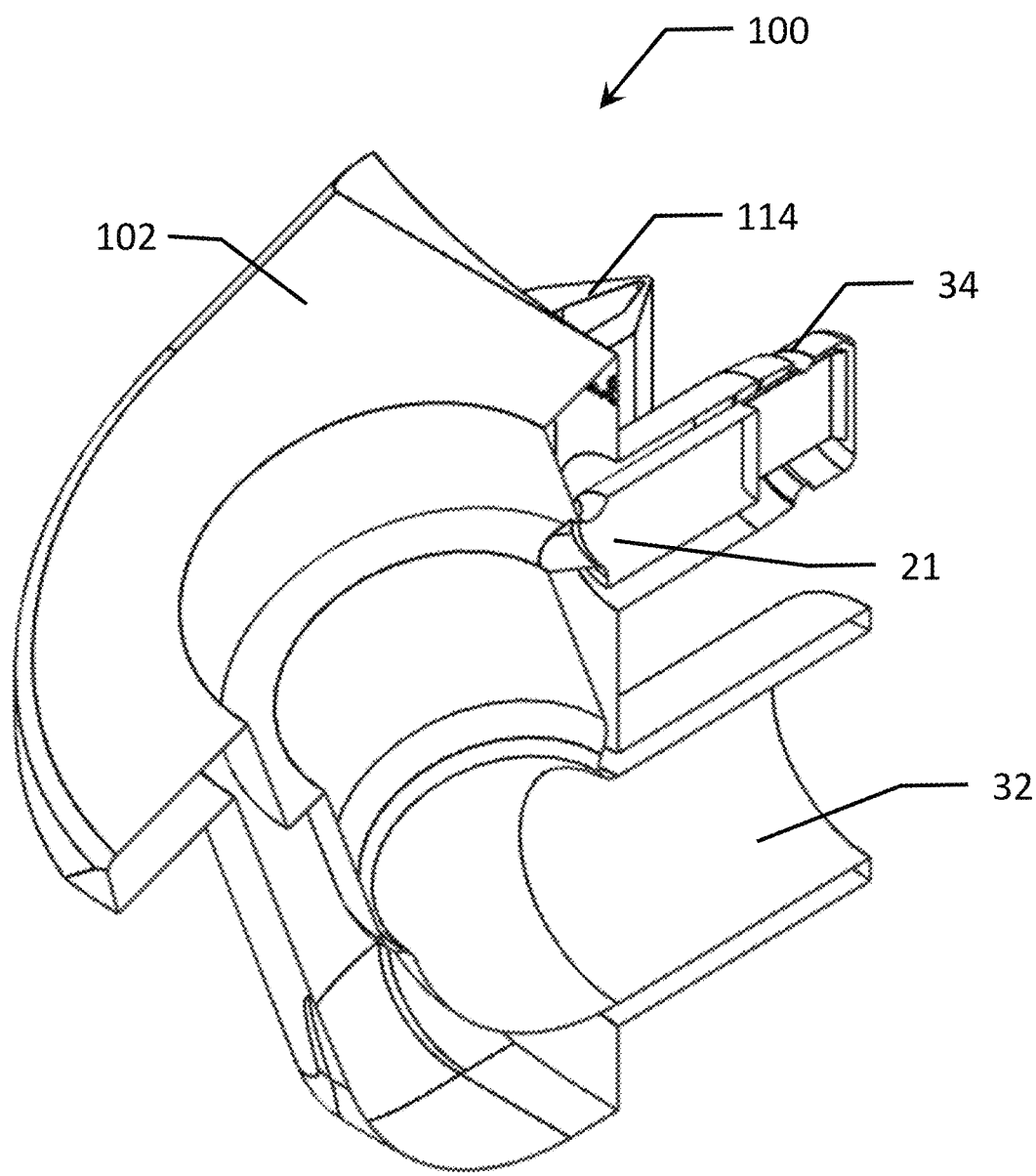
FIG. 9 illustrates a section cut perspective of a plug-in grow cup embodiment.

All embodiments of the invention work as an attachable plug-in component that can be oriented in several ways to suit the growing requirements of a variety of plants. With all variations of the grow cup, the inlet for nutrient rich water is the same structure allowing for nutrient rich water to travel from a reservoir and through the inlet while the cup is attached, which allows for intermittent nutrient rich water flow to the grow medium and roots of the plant, combining the methods of both NFT and aeroponics thus resulting in IFST. Nutrient rich water that is not absorbed or uptaken by the plant will exhaust through the return opening, allowing the nutrient rich water to flow downward and back into the reservoir for recirculating use. This return opening serves a dual function that in addition to facilitating the return of nutrient rich water to the reservoir, it also creates a path for the roots to grow in a controlled manner. This arrangement with the position of the nutrient rich water inlet (31 in FIG. 5 AND 21 in FIG. 9) directly above the return opening (30), causes gravity to force the root to grow through this passage and into the body of the grow system, and to be gradually saturated with nutrient rich water utilizing both dripping and a film while also providing aeration. The grow cup also allows for independent growth by functioning as a single grow chamber, mitigating issues of disease, and creating less hassle of root entanglement, letting users harvest and trim roots with ease.

The nutrient rich water inlet (31 in FIG. 5 AND 21 in FIG. 9), outlet ports (32 in FIGS. 4 and 5) and other structural elements have different configurations suited for different plant growth applications. The plug-in, small, large-plant, and deep rooting embodiments all utilize intermittent flow saturation technique (IFST). All configurations can be described as a hydroponic plant grow cup (100, 200, 300) with a nutrigation coupler (28) comprising a plug member (34) that attaches to a port (36), and when detached stops nutrient rich water flow (self-sealing valve) and return opening (30). This grow cup and nutrigation coupler 28 can support grow media receptacle (102), nutrient media (43), and suspends the plant in the air. The nutrient rich water or nutrigation fluid/nutrient mixture (20) is then dispersed through the inlet (21), is absorbed by the media (43), and drained through an outlet port (32) to aerate and irrigate nutrigation fluid/nutrients along the roots by creating a film across the interior geometry of grow cup.

Figure 10:
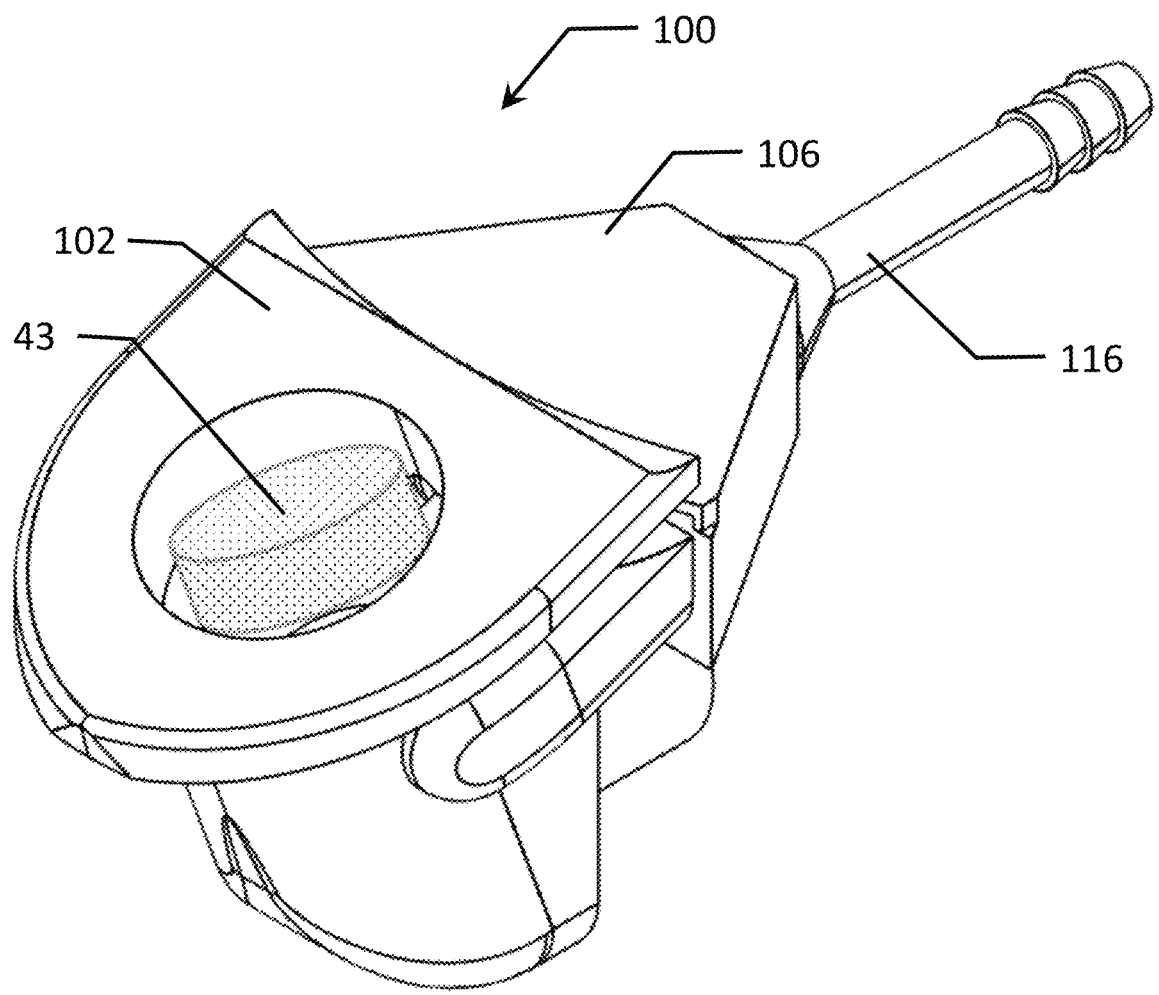
FIG. 10 illustrates a perspective view of a plug-in grow cup embodiment plugged into a typical socket housing with a nutrigation manifold connector.

A central nutrient rich water manifold 11 (106/116 in FIG. 10) connects to the grow cup from either a vertical orientation (like on a column or wall), or a horizontal orientation (like an irrigation line) and will drain either down a vertical hollow space or into a horizontal drainage system to either carry away nutrigation fluid/nutrients or recirculate them. The grow cup (17, 100, 200, 300) and nutrigation coupler (28) can be attached to different orientations both vertically and horizontally. The plug member (34) attaches to a port (36), creating a self-sealing valve (see 104 in FIG. 11), and drains through an outlet port (32) into a return opening (30).

In a vertical growing space, and even horizontal growing space, traditionally a combination of a support device and media will be used to support hydroponic plant growth. Although most grow media is inert, the plug-in grow cup is designed to support grow media that can combine solid nutrient compound that can be slowly dispersed into the water and directly to the root system as the media is saturated. In aeroponic plant growth, the plant is suspended in the air and sprayed with a nutrient rich water mixture through a nutrigation nozzle (which both aerates and supplies nutrients/nutrient rich water to the roots of the plants), a major setback of this style of growing is clogging. A more reliable system is called a nutrient film technique (NFT), which provides nutrient/nutrient rich water mix to the roots of the plant by having constant or intermittent nutrient rich water flow that runs along the roots of the plants in a channel style system. The space between the top of the channel and where the nutrient rich water runs is how the plant receives oxygen and aeration. There are limitations to the vertical application of the NFT hydroponic method because it requires the nutrient rich water to run along horizontal channels, while the channels can be stacked (with the use of supplemental lighting), the nutrient rich water flow must be horizontal. In the grow cup embodiments, the limitations of nozzle clogging in an aeroponic method, as well as the requirement of horizontal nutrient rich water flow in a nutrient film technique are eliminated by creating a intermittent flow saturation technique (IFST) inside the grow cup embodiment. IFST combines nutrient film technique and aeroponics in a way that creates a film that runs along the roots of the plant by the inner geometry of the grow cup, but does this vertically, as well provide saturation and aeration to the roots of the plants as they are suspended in the air, inside of a vertical draining space, referred to herein as the outlet port (32). The plants are supported by the plug-in grow cup itself in a grow media designed to fit in the cup, and suspended in the air, like in aeroponics, but the nutrient rich water flows across the roots similarly in a NFT system and flows vertically. This has the potential to provide better aeration because the water flow across suspended plant roots, and the interior cup walls can be designed to create a splash onto the root system.

FIGS. 8-12 show a plug-in removable grow cup 100 embodiment having a grow media receptacle 102, nutrient rich water inlet 21, and plug member 34 extending from the grow media receptacle 102 that connects to a socket member 36, said socket member comprising a self-sealing valve 104. The nutrigation coupler 28 can use a known "quick connect" embodiment as seen in FIG. 7, or another embodiment shown in FIG. 12 having a custom self-sealing valve 104. A nutrient rich water inlet 21 extends from the nutrigation coupler 28 and can be configured to distribute nutrient rich water 20 in the grow media receptacle 102 using a least one of a nutrient film technique and intermittent flow saturation technique. An outlet port 32 extending from the grow media receptacle 102 can be configured as a root growth channel and nutrient rich water 20 exhaust port. The nutrigation coupler 28 can further have a plunger 110, a biasing element 112, a socket seal 108, and a plug seal 117 to function as a self-sealing valve 104. The biasing element 112 can be a spring that biases the plunger 110 and socket seal 108 into a normally closed position and stop the flow of nutrient rich water 20 to the grow media receptacle 102. When the plug member 34 is inserted into the socket member 36, the biasing element 112 is compressed and the plunger 110 and socket seal 108 move away from the valve seat of the self-sealing valve 104, thereby permitting nutrient rich water 20 flow to the grow media receptacle 102. The grow media receptacle 102 can comprise grow media, with or without a solid nutrient medium supplement.

The plug-in grow cup can be removably disposed on at least one of a planting column 10, a wall, irrigation line or a manifold 11 using at least one attaching means 114 such as a clip, clamp, clevis, bolt, screw, hanger, hook and loop, socket housing 106, and nutrigation manifold connector 116, wherein said attaching means is configured for attaching to at least one of a planting column 10, wall, irrigation line or manifold 11. This attaching means can be attached to a vertical or horizontal device, that is either flat or curved (e.g., can attach to both a wall or a column).

In another embodiment shown in FIGS. 13-16 and referred to herein as a vegetable green grow cup or microgreen grow cup, nutrient film technique (NFT) can be used wherein the plug member 34, and outlet port 32 function the same as in the plug-in embodiment, a hydroponic plant grow cup having a plug 34 that engages with a socket 36, and when detached stops nutrient rich water 20 flow with self-sealing valve 104, similar to the plug-in grow cup, but the nutrient rich water 20 runs along a horizontal surface shown as a retention plate 206. The removable vegetable green grow cup can have a grow media receptacle 102 with at least one removable drainage tray 207 and at least one retention plate 206 to form at least one draining chamber 210 and at least one saturation chamber 212. The retention plate 206 can have at least one drain port 202, wherein the at least one drain port 202 has a drain port lip 204 to slow and control nutrient rich water 20 flow rate over the retention plate 206. The removable drainage tray 207 rests on top of the saturation chamber 212 and holds the grow media 208 to support seeds and plant growth. The removable drainage tray 207 is inserted on top of the saturation chamber 212.

A microgreen, or vegetable green, is a seedling having a central stem which has been cut just above the soil line during harvesting. It has two fully developed cotyledon leaves, and usually one pair very small, partially developed true leaves. Differences in the size and leaf configuration are based upon the specific plant variety. For example, Micro Borage is a very large microgreen. At 1" in height, it has a pair of very large cotyledon leaves and no true leaves. By comparison, Micro Mint has extremely tiny cotyledon leaves and will have 3-4 sets of true leaves at about 1" in height. More typical in size and leaf configuration for microgreens is Micro Basil at about 1-1½" in height, and ½" to 1" in width across the top and includes the cotyledon leaves and one set of very small true leaves.

Microgreens are not classified by the species of plant produced. The term is simply a classification based on the stage the plant is harvested. Unlike leafy greens and herbs that are grown to finished-sized plants when these species are grown as a microgreen they are harvested when their first true leaf is unfolded. Any species can be grown as a microgreen; production is based simply on the species having a desirable flavor and/or color. Many of the most popular microgreen species are in the mustard family (Brassicaceae), including arugula (*Eruca sativa*), radish (*Raphanus raphanistrum* sub sp. *sativus*), mustard (*Brassica juncea*), kale (*Brassica oleracea*), and watercress (*Nasturtium officinale*). Other leafy greens such as Swiss chard (*Beta vulgaris*) are also used. Many culinary herb species are also popular as microgreens as well, such as basil (*Ocimum basilicum*), dill (*Anethum graveolens*) and cilantro (*Coriandrum sativum*).

This vegetable green embodiment can be described as a hydroponic vegetable green grow cup with an optional internal valve mechanism that manually or automatically changes the direction of the nutrient rich water 20 flow from the outlet port 34 to either a saturation chamber 212 or drainage chamber 210, a removable drainage tray 207 rests atop the saturation chamber 212 to support media 208 and plant growth such as microgreens or other vegetable greens. This embodiment uses nutrient film technology to run nutrient rich water along the base of the retention plate 206 to saturate the grow media 208 resting in the removable drainage tray 207 and has an outlet port 32 that drains nutrient rich water from both the drainage chamber 210 and the saturation chamber 212. This attachment can be attached to a vertical or horizontal device, that is either flat or curved (e.g., can attach to either a wall or a column).

The attachment can have an option for a diverting valve. In a typical without a diverting valve, the nutrient rich water flows across the channel from the inlet, across the channel and directly out of a drainage port. Above this channel, a drainage tray with openings rests on the film on the nutrient rich water with a media or grow mat in the tray. The nutrient rich water will run along the bottom of the drainage tray and wick up through the base to be absorbed by the media. The seeds will be sown on the grow media. This single channel/chamber that sits below the drainage tray is the saturation channel. In another embodiment, an optional diverting valve that sits below the inlet port will redirect the nutrient rich water flow between the saturation channel and the drainage channel. The drainage channel will direct the nutrient rich water across the channel directly to the drainage port and will not saturate the media or plant roots, it is simply to divert the nutrient rich water flow to the drain/outlet port. This is useful because in the event the grower needs to create a separate irrigation timeline than the central nutrient rich water flow/pump's schedule, a manual or automated valve can redirect nutrient rich water flow as necessary. However, the attachment's use is not dependent on having this diverting valve for successful plant growth and is only an optional part of the design.

Traditionally, microgreens need a particular saturation style of hydroponic growing, and to do this one of the methods used is nutrient film technique (NFT). NFT methods in microgreens and other applications have the plant roots in a shallow stream of recirculating nutrigation fluid. The seeds are sowed on a root mat and then grow through the mat reaching the nutrient rich water underneath. The advantage of using the NFT method is increased oxygen/aeration compared to other methods like ebb and flow, and is relatively low maintenance. A limitation of NFT system for a stacked or vertical application, is that these systems still rely on tubing, horizontal channels or trays, and supplemental lighting. The grow cup inlet/outlet port supports this style of growing in a plug-in grow-cup space that can be attached to horizontal or vertical configurations, therefore eliminating the need for tubing, and supplemental lighting. In addition, in the event the nutrient rich water flow needs to be on a different nutrigation fluid schedule than the irrigation pump is scheduled to flow, a valve (that can be controlled manually or automatically) can re direct the nutrient rich water flow inside the grow cup chambers. This is possible with a two-chamber attachment. A draining chamber 210 directs nutrient rich water 20 to a draining port/outlet port 32, while the nutrient rich water flow to the top chamber directs the nutrient rich water flow to a saturation chamber where a draining tray that holds the media mat and seeds rests in such a way that when nutrient rich water flow is directed here, the nutrient rich water flow runs across the base of the mat or the roots. Also, using the self-sealing valve on the plug member, when the attachment is removed from the connection port, the nutrient rich water stops nutrient rich water flow, and the grow cup device can be removed completely from of the nutrigation fluid supply.

Microgreen seeds can be planted and grown in soil or a soil substitute such as wood fiber grow mat or other fibrous materials. They are ideally grown in bright natural sunshine, with low humidity and natural fresh air. The seed density is a fraction of what is used in sprout processing, so each individual plant has space in which to grow and develop. Most varieties require 1-2 weeks growing time, some 4-6 weeks. After the leaves are fully expanded the microgreens are ready for harvest. They are cut above the soil surface and packed without any roots. Some Microgreens are sold while still growing, rooted in the soil or another growing medium so that they can be cut by the end user. The living trays are more expensive and lower quality than well-grown pre-cut microgreens Microgreens, or vegetable greens, can be successfully grown in a variety of production systems. One of the most common systems is very similar to the nutrient-film technique (NFT) system used to grow lettuce and herbs; the primary difference between those systems used for lettuce and herbs to those used for microgreens is the size of the growing channel. Channels used for microgreens are two to three times wider than the traditional 4-inch-wide NFT channel.

Another system that works well for growing microgreens is an ebb and flow system. The primary difference between traditional NFT systems and ebb and flow systems is that in ebb and flow, the water beneath the grow media or root system is flooded and then drained away at short intervals typically spaced hours or days apart. This saturates the grow media and root system for periods of time, while an NFT system provides constant flow of water underneath root systems and media that saturates and also provides aeration during flow. The water flow in an NFT system can either be constant or intermittent. The vegetable green grow cup attachment utilizes the NFT method because it reduces the negative effects of stagnant water and reduces the chances of over saturation which can cause root rot, disease and other growth that could affect the health of the plants. These hydroponic systems utilize a fiber mat that comes in wood fiber or other absorbent materials as the growing substrate that seed is sown into and grown on. Microgreens can also be grown in containers such as large open packs or flats filled with soilless peat or coconut coir-based substrates.

Figure 17:
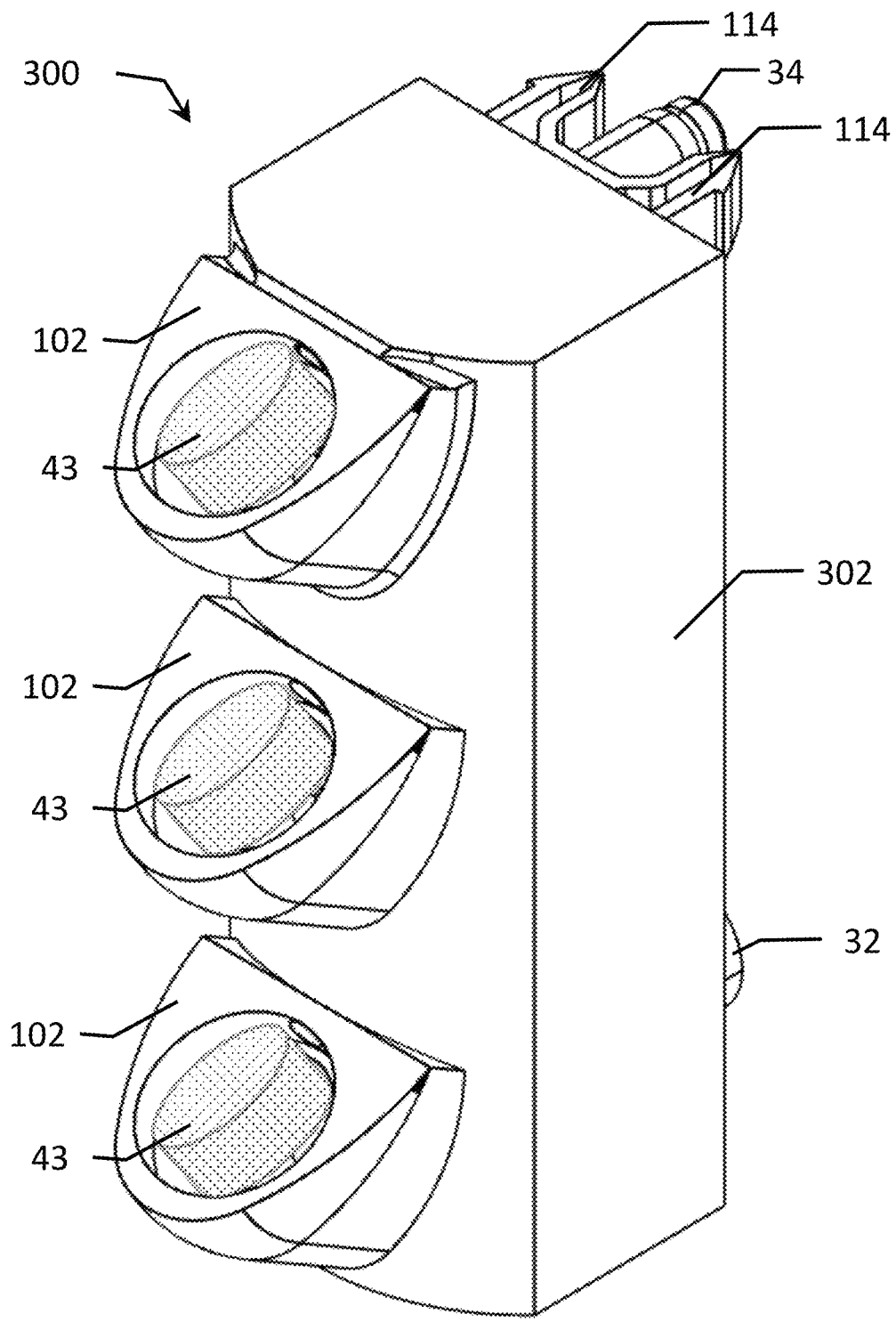
FIG. 17 illustrates a perspective view of a vertical cascade grow cup embodiment.
Figure 18:
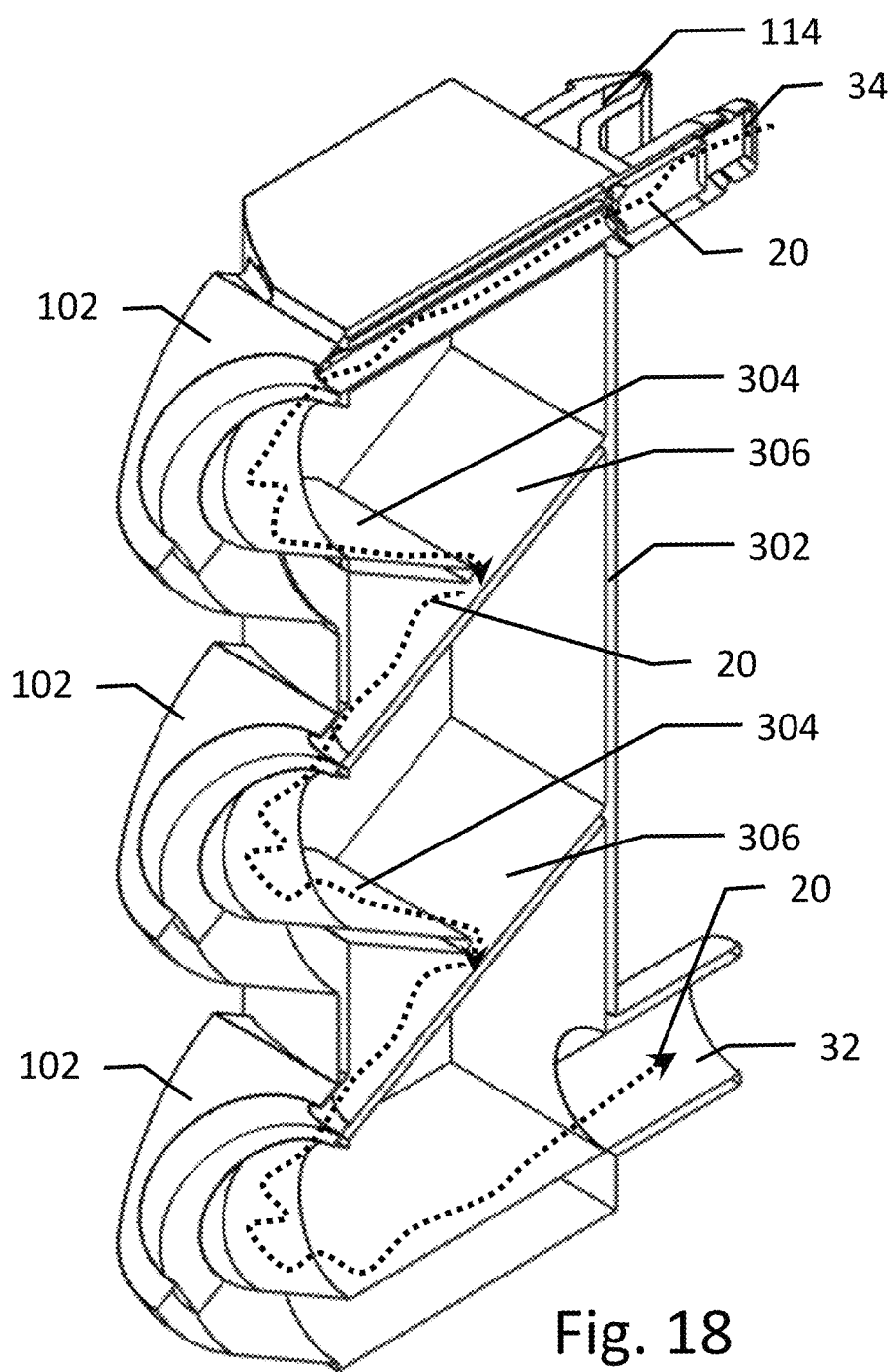
FIG. 18 illustrates a section cut of a vertical cascade grow cup embodiment.
Figure 19:
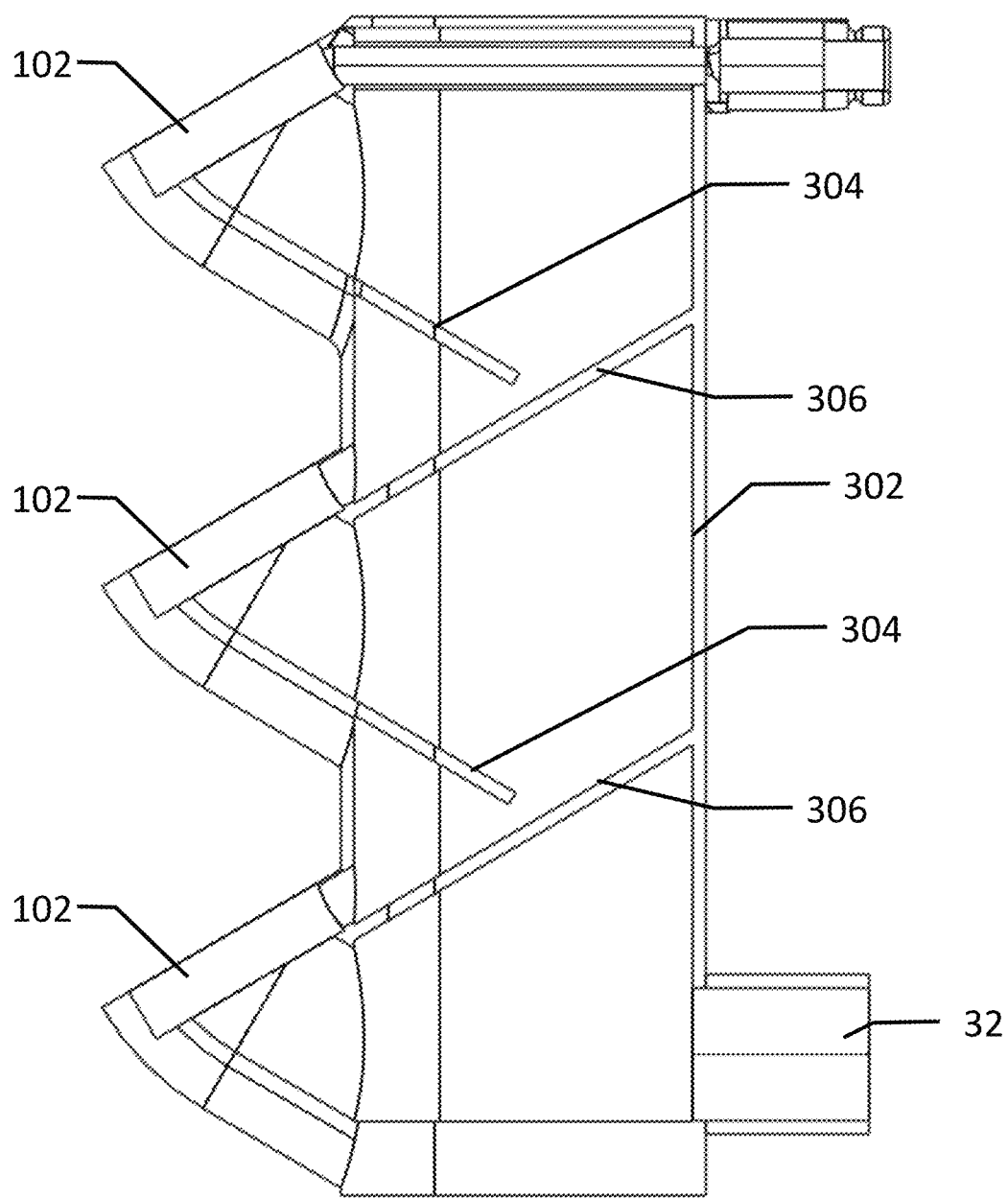
FIG. 19 illustrates a side view of a vertical cascade grow cup embodiment.

In another embodiment shown in FIGS. 17-19 and referred to herein as a vertical cascade grow cup 300, a hydroponic plant grow cup having a plug member 34 that attaches to a socket 36, and when detached stops nutrient rich water 20 flow with self-sealing valve 104, similar to the plug-in grow cup. A plurality of grow media receptacles 102 can be disposed on a cascade housing 302 configured for vertical cascade nutrient rich water flow. The cascade housing 302 can further have at least one return plate 304 and at least one splash plate 306.

The vertical cascade grow cup embodiment uses IFST in combination with cascading nutrient rich water flow that creates turbulence on angled planes to both aerate and supply nutrigation fluid/nutrients to the roots of the plants and directs nutrient rich water out a outlet port 32. This attachment is used in a vertical hydroponics planter that can be arranged in a single standing, row(s) or column arrangement.

The plug member also allows a vertical grow-cup that can be attached to a vertical structure with a that houses a self-sealing socket member, including the modular vertical growing column. The plug member can attach at one connection port and stretch to the below return opening on a lower module. The water will flow into the vertical cascade grow cup attachment by the same stream that enters the device though the plug member as the plug-in grow cup, however, internally there will be diagonally placed plates 304, 306 that create a cascading flow of water down the root area, therefore providing a splash of water/nutrient mix while also aerating the roots. Other devices use a drip or cascading system down the center of the entire growing device, column, wall or other orientation (as in, down the center of a grow tower/column, or stack drip system made from foam, or an irrigation drip wall.) The design being a detachable application, creates a customizable space that can grow a column of plants vertically, increasing yield volume for that space, while also being detachable for harvest, various arrangements and flexibility in the growing and other purposes. The cascading effect inside the grow cup itself also lends the ability to provide water and nutrients to multiple plants, therefore creating a smaller detachable hydroponic system that can be used in combination with other attachments or hydroponic growing techniques along the same water reservoir recirculating system (e.g. the modular hydroponic growing column or irrigation line) like the plug-in grow cup and microgreen attachment grow cup.

The foregoing explanations, descriptions, illustrations, examples, and discussions have been set forth to assist the reader with understanding this invention and further to demonstrate the utility and novelty of it and are by no means restrictive of the scope of the invention. It is the following claims, including all equivalents, which are intended to define the scope of this invention.

The invention claimed is:

1. A removable grow cup, comprising;
   a grow media receptacle,
   a nutrigation coupler extending from the grow media receptacle, the nutrigation coupler comprising a socket member and a mating detachable plug member,
     wherein said plug member comprises a nutrigation inlet extending from the grow media receptacle, said nutrigation inlet configured to distribute nutrient rich water in the grow media receptacle using at least one of a nutrient film technique and intermittent flow saturation technique,
     wherein said removable grow cup further comprises a self-sealing valve, a socket housing, a means for engaging said plug member, a means for attaching said grow media receptacle to at least one of a wall, planting column, and nutrigation manifold, and
   an outlet port extending from the grow media receptacle, said outlet port configured as a root growth channel and nutrient rich water exhaust port.

2. The removable grow cup of claim 1, wherein the nutrigation coupler further comprises a plunger, a biasing element, a socket seal, and at least one plug seal.

3. The removable grow cup of claim 2, wherein the biasing element is a spring.

4. The removable grow cup of claim 1, wherein the grow media receptacle comprises sprout media.

5. The removable grow cup of claim 4, further comprising a solid nutrient medium supplement disposed in at least one of the sprout media and nutrient rich water.

6. The removable grow cup of claim 5, wherein the solid nutrient medium supplement is disposed in sprout media comprising at least one of mulch, blankets, netting and silt fencing, peat-based substrates, perlite, vermiculite, rockwool, clay pebbles, and coco fibers.

7. The removable grow cup of claim 1, wherein said means for engaging comprises at least one of a spring-loaded ball-latching mechanism, bayonet mechanism, threaded mechanism, and non-latching mechanism.

8. The removable grow cup of claim 1, wherein said means for attaching comprises at least one of a clip, clamp, clevis, bolt, screw, hanger, and hook and loop.

9. The removable grow cup of claim 1, wherein the grow media receptacle comprises at least one vegetable green grow media and at least one retention plate to form at least one draining chamber and at least one saturation chamber, said receptacle configured for growing vegetable greens.

10. The removable grow cup of claim 9, wherein the retention plate comprises at least one drain port.

11. The removable grow cup of claim 10, wherein the at least one drain port comprises an adjustable lip configured to control nutrient rich water flow rate over the retention plate.

12. The removable grow cup of claim 1, further comprising a plurality of grow cup receptacles disposed on a cascade housing configured for vertical cascade nutrient rich water flow.

13. The removable grow cup of claim 12, further comprising at least one return plate and at least one splash plate.

\* \* \* \* \*